United States Patent
Chandrashekar et al.

(10) Patent No.: US 12,353,464 B2
(45) Date of Patent: Jul. 8, 2025

(54) SUBTITLE RENDERING BASED ON THE READING PACE

(71) Applicant: Adeia Guides Inc., San Jose, CA (US)

(72) Inventors: Padmassri Chandrashekar, Karnataka (IN); Daina Emmanuel, Karnataka (IN); Reda Harb, Tampa, FL (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/441,819

(22) Filed: Feb. 14, 2024

(65) Prior Publication Data

US 2024/0184817 A1 Jun. 6, 2024

Related U.S. Application Data

(63) Continuation of application No. 17/361,050, filed on Jun. 28, 2021, now Pat. No. 11,934,438.

(51) Int. Cl.
*H04N 21/235* (2011.01)
*G06F 16/34* (2019.01)
(Continued)

(52) U.S. Cl.
CPC .......... *G06F 16/345* (2019.01); *G10L 15/26* (2013.01); *H04N 21/2355* (2013.01);
(Continued)

(58) Field of Classification Search
CPC ... G06F 16/345; G10L 15/26; H04N 21/2355; H04N 21/23614; H04N 21/44204; H04N 21/4856; H04N 21/4884; H04N 21/434
See application file for complete search history.

(56) References Cited

U.S. PATENT DOCUMENTS 5,576,768 A 11/1996 Gomikawa
6,408,128 B1 6/2002 Abecassis
(Continued)

FOREIGN PATENT DOCUMENTS

RU 2668721 C1 * 10/2018
WO 2018140086 A1 8/2018

OTHER PUBLICATIONS

PCT International Search Report and Written Opinion for International Application No. PCT/US2021/064567, dated Apr. 26, 2022 (13 pages).

*Primary Examiner* — Benjamin R Bruckart
*Assistant Examiner* — Alexander Boyd
(74) *Attorney, Agent, or Firm* — HALEY GUILIANO LLP

(57) ABSTRACT

Systems and methods for summarizing captions, configuring playback speed, and rewriting the caption file for a media asset are disclosed. The system determines whether to display the original captions or a summarized version of the captions, which are based on user's language proficiency level, reading pace, and historical data, and can be generated either on-demand or automatically when rewinds and pauses are detected. The caption file which includes the original captions can be rewritten. The system determines whether to stream a caption or a rewritten file to a media device based on user or system selections. In the absence of a caption file, or when the caption file cannot be summarized, the playback speed of the media asset is slowed down to provide additional reading time to the user.

20 Claims, 20 Drawing Sheets

(51) Int. Cl.
  *G10L 15/26* (2006.01)
  *H04N 21/236* (2011.01)
  *H04N 21/442* (2011.01)
  *H04N 21/485* (2011.01)
  *H04N 21/488* (2011.01)
  *H04N 21/434* (2011.01)

(52) U.S. Cl.
  CPC . *H04N 21/23614* (2013.01); *H04N 21/44204* (2013.01); *H04N 21/4856* (2013.01); *H04N 21/4884* (2013.01); *H04N 21/434* (2013.01)

(56) References Cited

U.S. PATENT DOCUMENTS

| | | |
|---|---|---|
| 8,271,865 B1 | 9/2012 | Bennett |
| 9,558,159 B1 | 1/2017 | Thirupparangiri et al. |
| 9,571,870 B1 | 2/2017 | Wilson et al. |
| 9,672,203 B1 | 6/2017 | Bhar et al. |
| 11,416,530 B1 | 8/2022 | Chandrashekar et al. |
| 2004/0093220 A1 | 5/2004 | Kirby et al. |
| 2010/0030551 A1 | 2/2010 | Ark et al. |
| 2010/0225807 A1 | 9/2010 | Mears |
| 2011/0004330 A1 | 1/2011 | Rothkopf et al. |
| 2013/0100347 A1 | 4/2013 | Zinovieva |
| 2014/0201631 A1 | 7/2014 | Pornprasitsakul et al. |
| 2015/0006621 A1 | 1/2015 | Westphal |
| 2015/0277552 A1 | 10/2015 | Wilairat et al. |
| 2018/0197098 A1 | 7/2018 | Subbian et al. |
| 2018/0211556 A1 | 7/2018 | Sreedhara |
| 2018/0225519 A1 | 8/2018 | Chen et al. |
| 2018/0302686 A1 | 10/2018 | Bhattacharjee et al. |
| 2018/0302687 A1 | 10/2018 | Bhattacharjee et al. |
| 2019/0069013 A1 | 2/2019 | Abed |
| 2019/0200050 A1 | 6/2019 | Zhang et al. |
| 2019/0205373 A1 | 7/2019 | Walsh |
| 2020/0007946 A1 | 1/2020 | Olkha |
| 2020/0007947 A1 | 1/2020 | Narayanamurthy et al. |
| 2020/0134090 A1 | 4/2020 | Mankovskii et al. |
| 2020/0196022 A1 | 6/2020 | Sen et al. |
| 2020/0314479 A1 | 10/2020 | Umansky et al. |
| 2021/0019369 A1 | 1/2021 | Sharma et al. |
| 2021/0266473 A1 | 8/2021 | Engelke et al. |
| 2022/0272284 A1 | 8/2022 | Chandrashekar et al. |
| 2022/0414132 A1 | 12/2022 | Chandrashekar et al. |
| 2022/0414133 A1 | 12/2022 | Chandrashekar et al. |
| 2023/0010466 A1 | 1/2023 | Port et al. |

* cited by examiner

| Original Word/Phrase | Replaced Word/Phrase/Other | Approve | Reject |
|---|---|---|---|
| French Fries | Chips | | X |
| acknowledgement | mention | ✓ | |
| India |  | ✓ | |
| Hypocritical | Phony | ✓ | X |
| the process is complicated | the process is hard | ✓ | |
| She was happy today. |  | ☐ | ☐ |

Original Captions

| |
|---|
| `<body region="subtitleArea">` |
| `<div>` |
| `<p xml:id="subtitle1" begin="0.23s" end="2.86s">` |
| [Background music: Frank Sinatra song New York New York playing] |
| He communicated to me that he will be right back with the information. |
| [Traffic noise from outside the window] |
| `</p>` |
| `</div>` |
| `</body>` |

1170

Summarized Captions

| |
|---|
| `<body region="subtitleArea">` |
| `<div>` |
| `<p xml:id="subtitle1" begin="0.23s" end="2.86s">` |
| He told me that he will BRB with the info. |
| `</p>` |
| `</div>` |
| `</body>` |

| User Playlist |
|---|
| Movie: Good Will Hunting |
| Documentary: March of Penguins |
| CNN News: News Program dated May 15, 2021, at 8PM |
| Movie: Indiana Jones and the Last Crusade |
| Educational Tutorial: Understanding Video Streaming |
| Private Cloud Company X Video: HR policies and updates of company X |

FIG. 14

```
<body region="subtitleArea">
<div>
<p xml:id="subtitle1" begin="0.76s" end="3.45s">
It seems a paradox, does it not,
</p>
</div>
</body>
```

FIG. 15

```
<body region="subtitleArea">
<div>
<p xml:id="subtitle1" begin="0.23s" end="4.76s">
1.  [Tires Screech]
2.  Person 1: Why don't you go to the shop to buy the grocery?
3.  Person 1: So? You gonna go?
4.  Person 2: I can't, its not safe out there with those robbers running around.
5.  [Gun shots]
6.  [People Screeming]
</p>
</div>
</body>
```

FIG. 16

SUBTITLE RENDERING BASED ON THE READING PACE

CROSS-REFERENCE TO RELATED APPLICATION

This application is a continuation of U.S. patent application Ser. No. 17/361,050, filed Jun. 28, 2021, the disclosure of which is incorporated by reference herein in its entirety.

FIELD OF INVENTION

Embodiments of the present disclosure relate to rendering captions and subtitles of a media asset based on the user's language proficiency level and reading pace, including customizing the closed-captioned file and automatically adjusting playback speeds of the media asset. They also relate to rewriting the captions file based on user language proficiency and using it instead of the original captions file.

BACKGROUND

Closed captioning and use of subtitles are commonly used to provide textual version of speech and dialog in a media asset. Captions enhance user viewing experience by either translating a foreign language or providing a word-to-word synchronized transcript of discussion between characters on a screen such that the user can read along while watching the media asset. In addition to dialog, closed captioning and subtitles may also describe other non-speech sound effects, such as a car chase, high winds, tornadoes, a lion's roar such that a user can read what is visually occurring in the media asset.

Although closed captioning and subtitles serve a similar purpose of providing a textual representation of speech and sounds displayed in a media asset, they differ in some respects. Closed captioning, also referred to as captions, CC, or closed captions, provide word-for-word speech transcript of the speech that occurs on a frame-by-frame, or segment-by-segment, basis during the playback of a media asset. It also includes description of non-speech audible sounds, such as sound effects and background noise, such as background music playing or traffic noise. In some instances, a user is provided the option of turning the closed captioning ON/OFF as desired.

In some countries closed captions are required by law to make speech and other audio accessible to people who are deaf or hard of hearing, especially in situations when the media asset or broadcast is made using public channels, such as news or a presidential debate. Aside from serving the deaf or hard of hearing, closed captioning is frequently used in settings where it is preferred that sound is either turned off or audible at a lower volume, such as hospitals where it may disturb patients or public settings where there is too much noise. In other situations, individuals may prefer to read the text rather than hear the speech and sounds in the media assets.

Subtitles differ from closed captioning in the sense that they are not a word-to-word transcription of the dialog played back on the media asset. Their typical use is to translate the dialog/speech depicted on display into other languages so the media asset can be watched by viewers who do not understand the language spoken in the media asset. For example, a French movie having all dialogue in French can be watched by an English-speaking viewer who does not understand French if the subtitles are provided in English. Subtitling is also usually to communicate and translate the foreign speech and not used for sounds effects. In some instances, a user can turn ON/OFF subtitles by selecting the same closed captioning selections and sub-selections.

Current closed captioning and subtitling methods have several drawbacks. For simplicity, both closed captioning and subtitling are collectively referred to herein as captions or captioned text unless mentioned separately in some instances.

One such drawback is the amount of time captions are displayed on the screen. Since dialog and sound effects are associated with a scene being displayed on the display screen, captions are meant to be synchronized to provide context such that a viewer can see the relationship between the dialog (or other sounds and sound effects) and the scene displayed. However, in many instances, the amount of captioned text to be read require far greater time and cannot be read while the associated scene is displayed. This often results in the user unable to read the full captions before the scene changes to a next scene. In such situations, either the user continues watching loses the full context of the scenes or rewinds and replays the scene to re-read the amount of captioned text displayed. In some instances when the characters speak fast or a lot of action is packed into a scene (also referred to as a video frame, set of video frames, or video segment), the user may have to rewind and pause multiple times to be able to read the captioned text.

Some attempts have been made to assist rewinding and replaying of the content; however, such attempts are limited and only assist in rewinding and replaying. Such solutions still require the user to spend additional time watching the content and in many instances still resulting in the user rewinding and replaying it multiple times. For example, Siri on Apple TV allows a user to replay such content by issuing a voice command where a user can say "what did she say" and the last 15 seconds of the video gets replayed with closed caption displayed. (Siri is a trademark owned by Apple Inc.) There are also other solutions that can delay or speed up the display of subtitles but that only addresses the synching issues and does not solve the drawback of requiring the user to read the larger amount of captioned text within the timeframe of the related scene.

With respect to subtitling methods, one of the drawbacks include translation of the text largely dependent upon the language proficiency of the individual, company, or system performing the translations. For example, the captions that result from the subtitles may be performed by someone who has a higher (or lower) language proficiency than the user watching the media asset or the person/system performing the subtitles may use words to their own liking which are not suitable or customized for the viewer thereby causing the user to re-read the captions to gain a better understanding of the context.

As such, there is a need for a system and method for rendering captions text that is readable within the time frame of the displayed scene that is contextually related to the captioned text, ensuring that the captioned text is suitable to the user's language proficiency level, and providing solutions for situations where captioned text may not be available.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 11B is a side-by-side view of a portion or original caption content and summarized version of the original caption content, in accordance with some embodiments of the disclosure;

FIG. 14 is an exemplary playlist populated by a user, in accordance with some embodiments of the disclosure;

FIGS. 15 and 16 are exemplary portions of caption files, in accordance with some embodiments of the disclosure;

DETAILED DESCRIPTION

Figure 1:
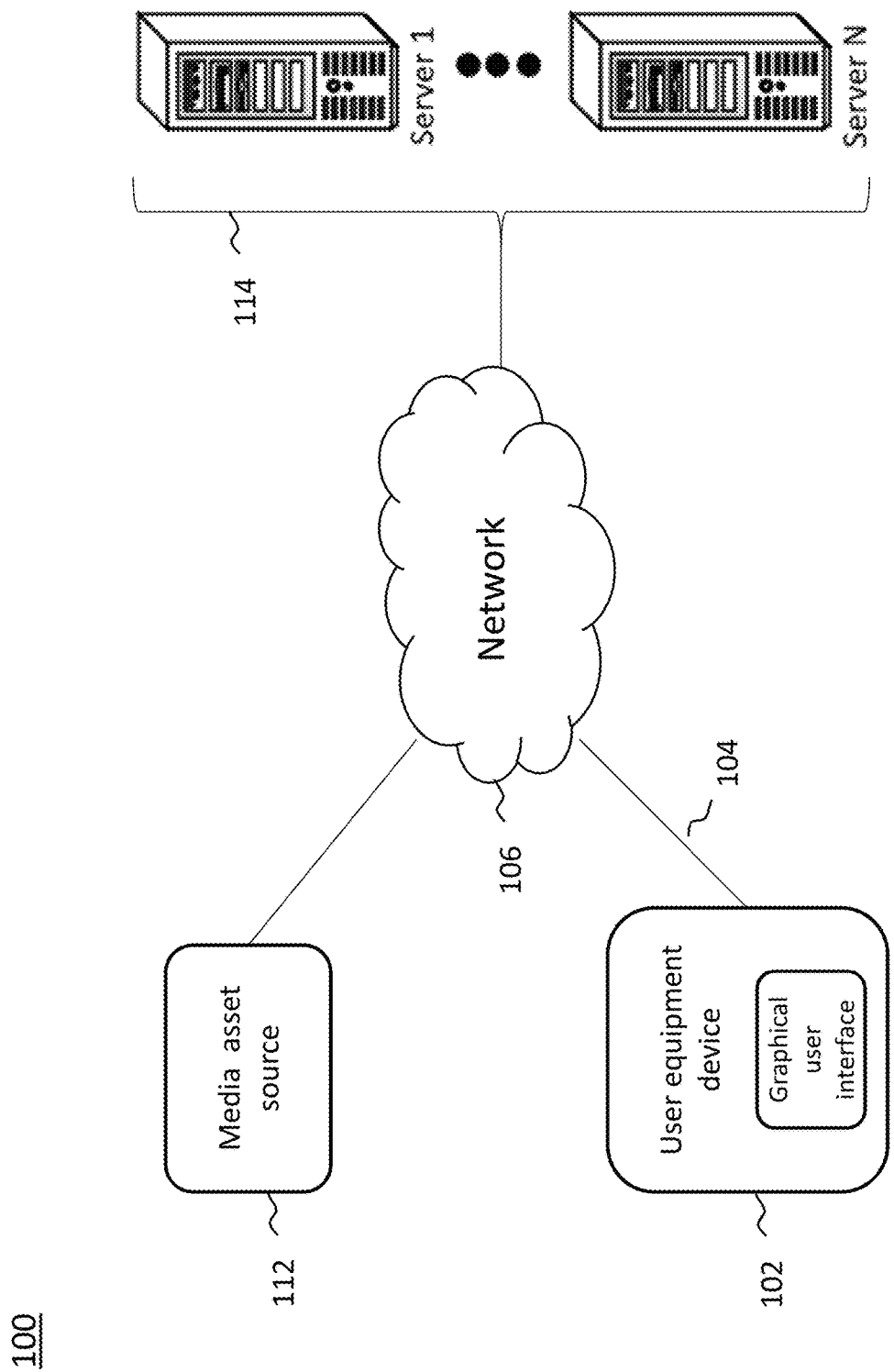
FIG. 1 is a block diagram of an exemplary system for rendering captioned text and configuring playback speeds, in accordance with some embodiments of the disclosure.

In accordance with some embodiments disclosed herein, the above-mentioned limitations are overcome by automatically, or by user selection, summarizing the captioned text, slowing down the playback speed when a caption file is not available or cannot be summarized, and rewriting the caption file based on user language proficiency level. Additionally, some embodiment also slow down the playback speed when summarizing a caption file exceeds a level of difficulty.

Summarizing the captioned text comprises determining the user's language proficiency and reading pace. Summarization also includes customizing and personalizing captions based on user preferences, user consumption history of media assets, user profile, and other user online interactions. Additional factors, such as the location of the user, are also determined in converting the captions text to a summarized text.

In one embodiment, the summarization includes abbreviating the displayed captioned text. In other embodiments, summarization includes replacing words, using synonyms and antonyms, using icons, rewording the text, and inserting other graphics that replace or give meaning to a word or a captioned phrase, such as using emoticons to reflect emotions. Various speech recognition software, virtual assistants, or web services may also be used to determine which words and phrases are to be summarized and personalized, including the format of the summarized text.

Machine learning and artificial intelligence algorithms may also be used in generating a model that can be trained to understand user preferences based on user consumption patterns and other user communications and online interactions. The trained and periodically updated model can be used to summarize the captions text presented. The summarization and/or modification can occur either in real-time, at the point of selection of the media asset for playback, or during an earlier playback portion of the media asset, such as during the introductions or credits. A user interface may also be generated and presented to the user for approving the summarized words and phrases. For example, the user interface may present a list of all summarized words and phrases to the user at the end of the playback of the media asset. The summary of words/phrases replaced or summarized may also be available at any interim point during the playback of the media asset. The user may either approve or reject the summarized or replaced words and phrases and the feedback may be used by the machine learning and artificial intelligence algorithms to continuously or at periodic intervals update the user preferences. The feedback and other data based on user consumption may be used to enhance the algorithms and summarize future captioned text with a higher probability of meeting user preferences.

In one embodiment, the captioned text may be summarized automatically by the system. In another embodiment, the user, prior to watching the media asset, or any time during playback, may turn on closed captioning and summary mode using the user interface.

In yet another embodiment, the system may automatically turn on summary mode when repeated rewinds are detected. In this embodiment, the system may detect a rewind command for a segment of the media asset. If the number or rewind commands received exceed a threshold, then the system may determine if the rewind is related to additional time needed by the user for reading the captioned text. This may be determined using several mechanisms, for example, the system may determine the number of captioned words or characters displayed on the screen and the start and end time of the corresponding scene. If the system determines that the number of words cannot be read within the start/end time of the corresponding screen either by an average reader or specifically by user viewing the media asset, then the system may associate the rewind with as an indication that the user requires additional time to read the captioned text.

Figure 6:
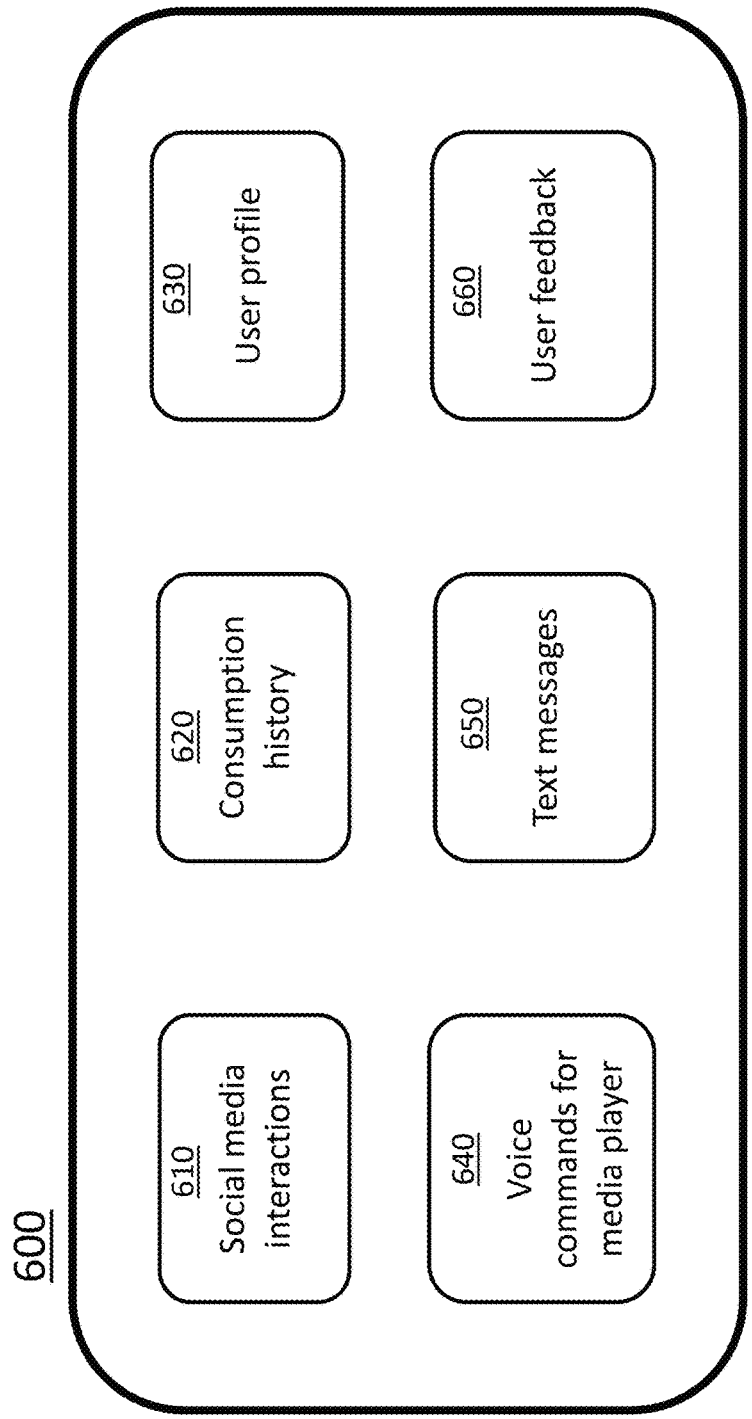
FIG. 6 is a block diagram of a plurality of factors that may be considered in determining the summarized text for the media asset, in accordance with some embodiments.

As such, if the number of rewinds exceeds the threshold, which may be 2, 3, or X number of rewinds as defined by the user or the system then the system may automatically turn on the summarize mode and summarize the captioned text based on user preferences, user language proficiency, user's reading pace, user profile, media consumption history, or other factors that are mentioned throughout this application, including in FIG. 6. In another embodiment, if the number of rewinds exceeds the threshold it may trigger a command to generate the summarized version of the set of captions when the number of words, or characters, in the set of captions exceed a word, or character, count threshold. In yet another embodiment, if the number of rewinds exceeds the threshold it may trigger a command to rewrite a caption file that includes the set of captions and replace the original captions file that's is currently used by the player by associating the newly generated rewritten captions file with the media asset being consumed.

The system may also automatically turn ON summary mode at any point during playback if a detection is made that captions associated with the current video segment, or an upcoming video segment, include words or characters that exceed a threshold thereby signaling that the number of words or characters cannot be read within the timeframe of the associated video segment's start and end times. The terms "frame," "set of frames," "segment," or "video segment," are used interchangeably and refer to a portion of the media asset within a specific timeframe.

In another embodiment, a closed caption or subtitled file may not be available. As such, there may be no captioned text available for summarizing. In another embodiment, the closed caption or subtitled file may be available, however, it may not be possible to convert the captioned text to a summarized version. For example, the word usage may not be recognized, or the translation of a language may be improper. Whatever the reason may be, if either the closed caption or subtitled file is unavailable or a word substitution and summarization is not possible, then the system may determine whether the user requires additional time to digest the dialog presented in a scene. If additional time is required, then the system would automatically slow down the playback speed of one or more segments of the media asset such that the user has adequate time to digest the dialog and other audible sounds presented through the media asset. The speeds may automatically be adjusted to a default setting or the user may predefine a preferred speed that can be used for playback when such a situation arises.

In another embodiment, the system includes a manifest file, which is used by the system to configure and deploy various functions. In one embodiment, the manifest file references the caption file. The manifest file also lists URL(s) that reference the media segment files. Streaming protocols such as DASH and HLS rely on the use of manifest files to request media segment files (e.g., small files that are few seconds long) to play video and/or audio data. In operation, the manifest file may be sent along with the media asset or separately as a "side car" file to the media device, such that it can be used to configure and deploy various media device functions.

In another embodiment, the system may rewrite the closed caption or subtitled file. In this embodiment, the system may consider the user's preferences, language proficiency levels, past consumption history, user profile, and other sources of data, such as user interactions with social media, to rewrite the closed caption and/or the subtitled file and personalize it to the user's language proficiency and likings. The original caption file may be replaced with the rewritten/manifest caption file and used during the playback of the media asset. When the file is rewritten, the manifest file references the newly rewritten file instead of the original captions file. Alternatively, the user may also prefer a side-by-side display of original and rewritten caption file for particular segment of the media asset where the user desires to see both. The system may rewrite the caption file at any given time, such as before, during, or after the playback of the media asset. The system may also rewrite the caption file associated with a media asset, or a plurality of media assets, when the media asset(s) are placed into a playlist, selected for display, or scheduled for future consumption.

Figure 2:
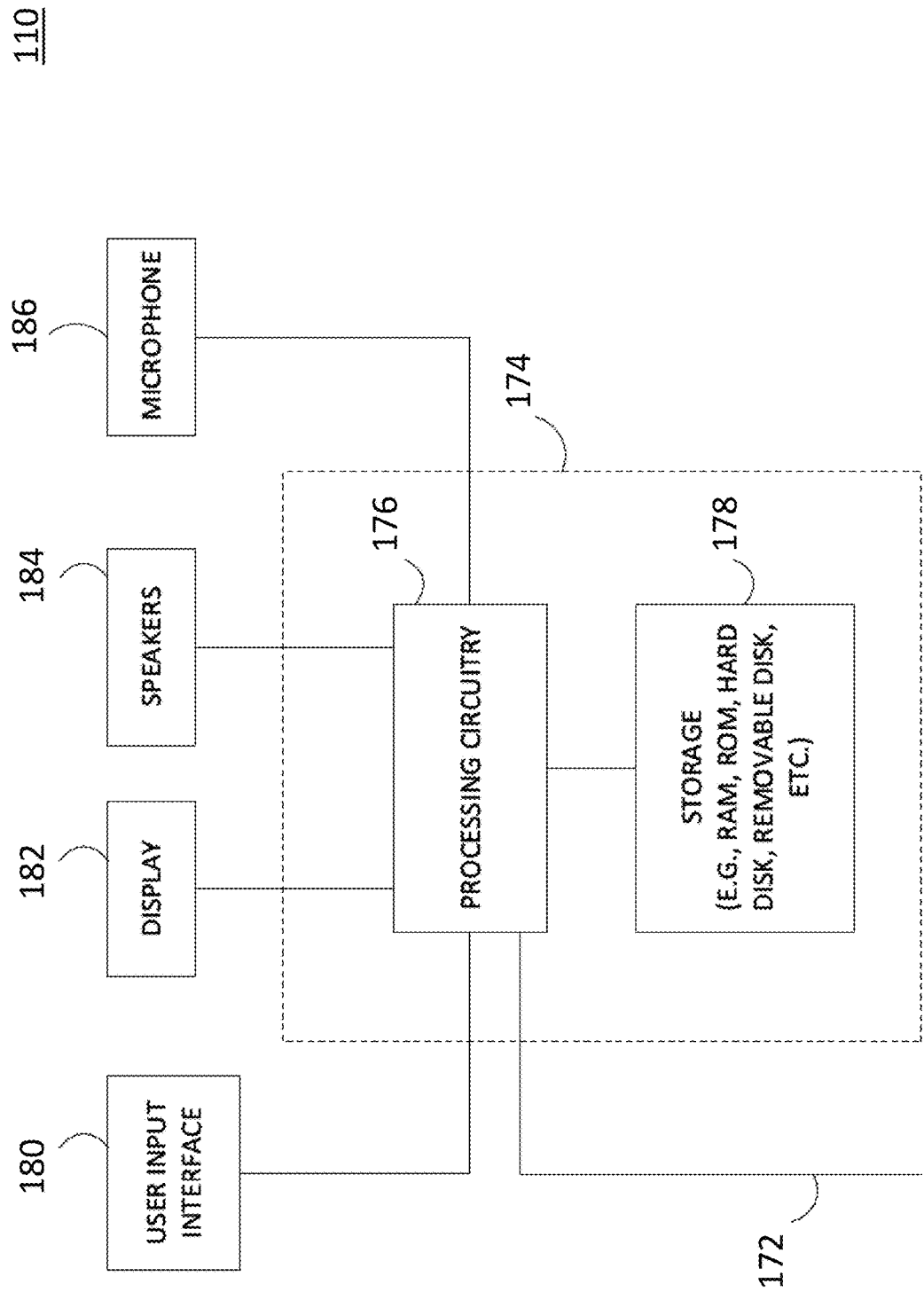
FIG. 2 is a block diagram of a generalized media device, in accordance with some embodiments of the disclosure.

FIGS. 1-2 describe exemplary devices, systems, servers, and related hardware for rendering captions of a media asset based on the user's language proficiency level and reading pace, including customizing the captioned file and automatically configuring playback speeds of the media asset, in accordance with one embodiment. They also describe exemplary devices, systems, servers, and related hardware for rewriting the captioned file based on user language proficiency and other factors and using the rewritten caption file instead of the original captioned file, in accordance with one embodiment. In the system 100, there can be more than one user equipment device 102 but only one is shown in FIG. 1 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 106.

The user equipment devices may be coupled to communications network 106. Namely, the user equipment device 102 is coupled to the communications network 106 via communications path 104. The communications network 106 may be one or more networks including the Internet, a mobile phone network, mobile voice or data network (e.g., a 4G, 5G, or LTE network), cable network, public switched telephone network, or other types of communications network or combinations of communications networks. The path 104 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 104 can be a wireless path. Communication with the user equipment device may be provided by one or more communications paths but is shown as a single path in FIG. 1 to avoid overcomplicating the drawing.

The system 100 also includes media asset sources, such as video asset sources 112, and one or more servers 114, which can be coupled to any number of databases providing information to the user equipment devices. The information sources 112 represent any computer-accessible sources, such as servers, databases, platforms (such as video sharing platforms) that store media assets, such as video assets. The server 114 may store and execute various software modules, such as for example for auto summarizing caption text, determining playback speeds, rewriting caption files, and training the machine learning algorithms. In some embodiments, the user equipment device 102, media asset sources 112, and server 114 may store metadata associated with media assets. In some embodiments, the server may transmit a command to cause the display of a user interface on the display screen of a media asset device. The user interface may be used by the user to select preferences, execute commands, and approve or reject summarized text. The user interface may also be used by the system to obtain user profile or user consumption history.

FIG. 2 shows a generalized embodiment of a user equipment device 200, in accordance with one embodiment. In an embodiment, the user equipment device 200, is the same user equipment device 102 of FIG. 1. The user equipment device 200 may receive content and data via input/output (I/O) path 202. The I/O path 202 may provide audio content (e.g., broadcast programming, on-demand programming, Internet content, content available over a local area network (LAN) or wide area network (WAN), and/or other content) and data to control circuitry 204, which includes processing circuitry 206 and a storage 208. The control circuitry 204 may be used to send and receive commands, requests, and other suitable data using the I/O path 202. The I/O path 202 may connect the control circuitry 204 (and specifically the processing circuitry 206) to one or more communications paths. I/O functions may be provided by one or more of these communications paths but are shown as a single path in FIG. 2 to avoid overcomplicating the drawing.

The control circuitry 204 may be based on any suitable processing circuitry such as the processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The rendering of captions and subtitles of a media asset based on the user's language proficiency level and reading pace, including customizing the closed captioned file and automatically adjusting playback speeds of the media asset and related functions and processes as described herein can be at least partially implemented using the control circuitry 204. The rewriting the captioned file based on user language proficiency and other factors, and having the manifest file reference the rewritten caption file instead of the original captioned file and related functions and processes as described herein can also be at least partially implemented using the control circuitry 204. The processes as described herein may be implemented in or supported by any suitable software, hardware, or combination thereof. They may also be implemented on user equipment, on remote servers, or across both.

In client-server-based embodiments, the control circuitry 204 may include communications circuitry suitable for communicating with one or more servers that may at least implement the storing of the media assets, caption files, summarized files, substituted words, machine learning and artificial intelligence algorithms, manifest, caption and subtitle files and related functions and processes as described herein. The instructions for carrying out the above-mentioned functionality may be stored on the one or more servers.

Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 208 that is part of the control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 208 may be used to store various types of content described herein, such as media assets, substituted words, machine learning and artificial intelligence algorithms, manifest, caption and subtitle files, user profile, user consumption history, and metadata associated with the media asset. Nonvolatile memory may also be used (e.g., to launch a boot-up routine and other instructions). Cloud-based storage, described in relation to FIG. 1, may be used to supplement the storage 208 or instead of the storage 208.

The control circuitry 204 may include audio generating circuitry and tuning circuitry, such as one or more analog tuners, audio generation circuitry, filters or any other suitable tuning or audio circuits or combinations of such circuits. The control circuitry 204 may also include scaler circuitry for upconverting and down converting content into the preferred output format of the user equipment device 200. The control circuitry 204 may also include digital-to-analog converter circuitry and analog-to-digital converter circuitry for converting between digital and analog signals. The tuning and encoding circuitry may be used by the user equipment device 200 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 208 is provided as a separate device from the user equipment device 200, the tuning and encoding circuitry (including multiple tuners) may be associated with the storage 208.

The user may utter instructions to the control circuitry 204, which are received by the microphone 216. The microphone 216 may be any microphone (or microphones) capable of detecting human speech. The microphone 216 is connected to the processing circuitry 206 to transmit detected voice commands and other speech thereto for processing. In some embodiments, voice assistants (e.g., Siri, Alexa, Google Home and similar such voice assistants) receive and process the voice commands and other speech.

The user equipment device 200 may include an interface 210. The interface 210 may be any suitable user interface, such as a remote control, mouse, trackball, keypad, keyboard, touch screen, touchpad, stylus input, joystick, or other user input interfaces. A display 212 may be provided as a stand-alone device or integrated with other elements of the user equipment device 200. For example, the display 212 may be a touchscreen or touch-sensitive display. In such circumstances, the interface 210 may be integrated with or combined with the microphone 216. When the interface 210 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 210 may be HDTV-capable. In some embodiments, the display 212 may be a 3D display. The speaker (or speakers) 214 may be provided as integrated with other elements of user equipment device 200 or may be a stand-alone unit. In some embodiments, the display 212 may be outputted through speaker 214.

The user equipment device 200 of FIG. 2 can be implemented in system 100 of FIG. 1 as user equipment device 102, but any other type of user equipment suitable for rendering of captions and subtitles of a media asset based on the user's language proficiency level and reading pace, including customizing the captioned file and automatically adjusting playback speeds of the media asset and related functions and processes as described herein. It may also be implemented in system 100 as user equipment device 102, but any other type of user equipment suitable for rewriting the captioned file based on user language proficiency and other factors and using the rewritten caption file instead of the original captioned file and related functions and processes as described herein. For example, user equipment devices such as television equipment, computer equipment, wireless user communication devices, or similar such devices may be used. User equipment devices may be part of a network of devices. Various network configurations of devices may be implemented and are discussed in more detail below.

Figure 3:
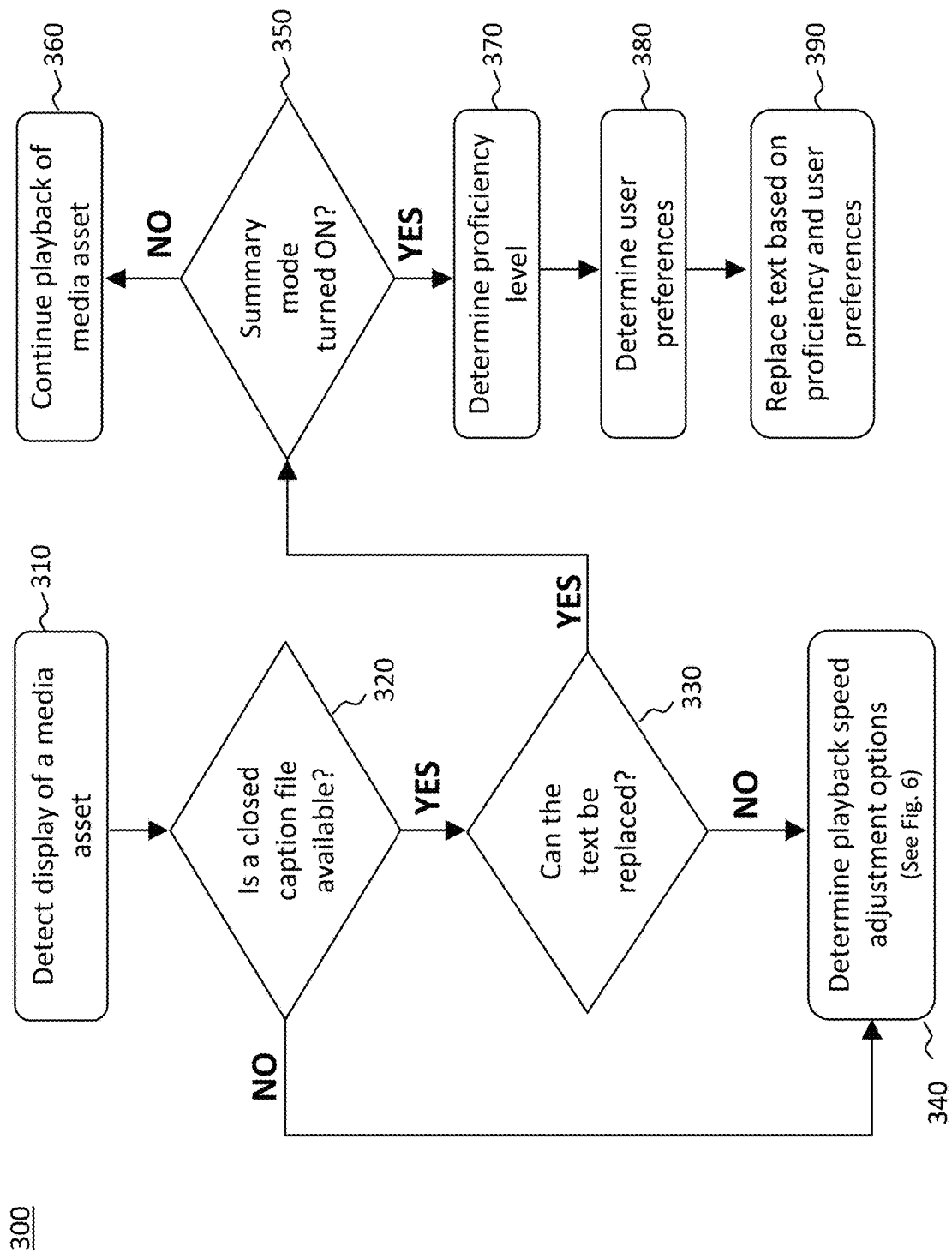
FIG. 3 is flowchart of a process for rendering summarized captions and configuring playback speed, in accordance with some embodiments of the disclosure.

FIG. 3 is flowchart of a process 300 for rendering summarized captions and configuring playback speeds, in accordance with some embodiments of the disclosure. The process results in summarizing the displayed captions based on user's language proficiency, reading pace, and additional factors such that a user may be able to read caption text that is personalized within the allotted time of the scene that corresponds to the captioned text being displayed on the display of the media device. Additionally, when a captioned file is unavailable or unable to be summarized, the process adjusts the speed of the playback to allow adequate time for the user to digest the dialog presented on the screen.

The process 300 begins at block 310. At block 310, in one embodiment, the display of a media asset is detected. The media asset may be a video asset, such as a video taken from a mobile phone to a movie, episode, documentary, to an animation, etc. The media asset may also be a television show, a movie, a documentary, a new segment, a website page, a music album, a song, or any other type of audio or video asset.

The system may detect the display of the media asset by receiving an indication. The indication may be in response to a media asset selection made by a user using a user interface. The indication may also system generated to signal that content is being displayed.

Upon detecting the display of the media asset or receiving an indication that a selection was made using a user interface, at block 320, the system determines whether a caption file is available for the selected or displayed media asset. As described earlier, the caption file may be a closed caption file or a subtitled file. The caption file includes a textual representation of speech and dialog of characters displayed in the media asset for a particular segment of time. For example, a set of captions may be synchronized and associated with a particular video segment of the media asset (such as being embedded with the associated video segment). The caption file may also include description of non-speech audible sounds, such as sound effects and background sounds and noise. It may also include a transcription of the speech and dialog or a translation from a foreign language that is subtitled.

If at block 320, a determination is made that the caption file is available, then at block 330, a determination is made whether the text in the captioned file can be replaced or summarized.

In situations where a determination is made that the caption file is not available at block 320 or that a caption file is available but it cannot be read by the system, summarized, or words/phrases from the caption file cannot be replaced or computed for any reason, then the process from blocks 320 and 330 moves to block 340 where a determination is made as to what speed the media asset is to be played back during a particular time segment. For example, the words/phrases in the captioned file may not be replaced because the word usage may not be recognized, or the translation of a language may be improper, or the file may have errors or be corrupted.

Regardless of the reason, when the caption file is not available or unusable for the purpose of summarizing, then the determination at block 340 is made. The determination includes configuring and adjusting the playback speed to a pace that the viewer can digest the information presented on the screen. For example, the system determines the amount of dialog and what an average user, or the specific user watching the media asset, would require to audibly hear and understand the dialog presented. If the amount of dialog is higher, then the media asset is played back at a slower speed than when the amount of dialog is less. Additional details regarding the process to slowdown the playback is described in the discussion of FIG. 10.

Referring back to block 330, if a determination is made that a caption file exists and the caption text can be replaced, the system may use natural language processing (NLP) to process the caption file such that captions can be intelligibly replaced. For example, the system may employ various NLP techniques combined with artificial intelligence to determine the context of the captions. It may also apply linguistic meaning to captions such that suitable replacements can be made based on the context and linguistic meaning.

Figure 4:
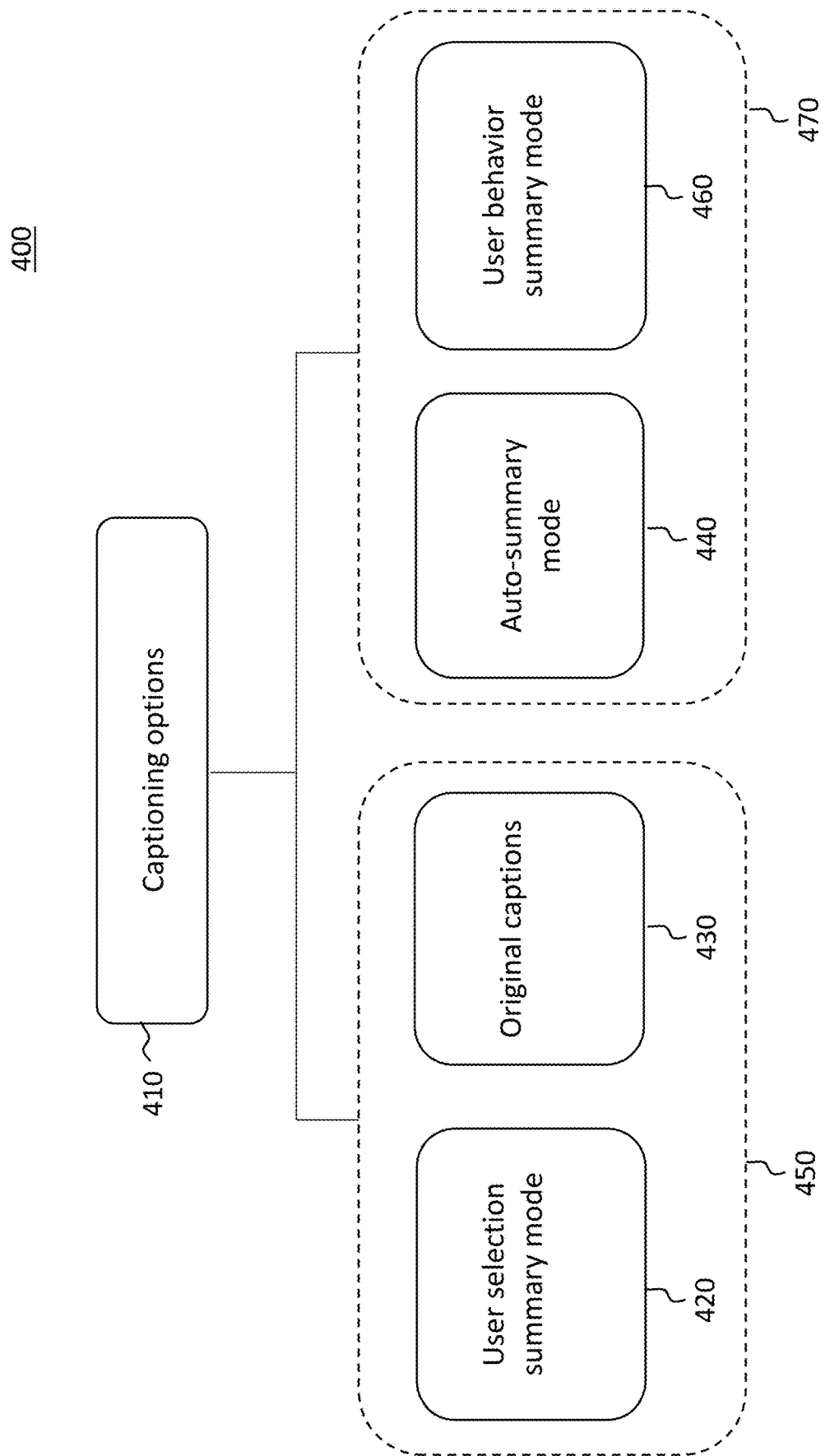
FIG. 4 is block diagram for selection captioning options, in accordance with some embodiments of the disclosure.

At block 330, the system also determines if the summary mode is turned ON. In one embodiment, the system may provide the following options relating to summary mode. As depicted in FIG. 4, the captioning options include auto-summary mode 420, user selection summary mode 430, original caption 440, and user behavior summary mode 460.

In one embodiment, the system may automatically, as a default, have the auto-summary mode turned ON. In this scenario, the caption text may be summarized on a case-by-case, frame-by-frame basis, or segment-by-segment basis. In some embodiments the caption text may be summarized or reworded when a determination is made that the number of words displayed for a particular segment exceed the threshold number of words that either an average user, or specifically the user watching the media asset, can read while the associated segment is still displayed and before the playback moves to the next segment making the previous text contextually unrelated to the next segment.

For example, a determination may be made as to whether the number of words displayed for a particular segment exceed the threshold number of words that can be read by a user. The determination may involve considering factors such as number of words or characters, length of the sentence, complexity of words, the duration between the start/end times when the captions would be displayed (indicated in the caption file, also referred to as subtitle file in some instances), as well as the language proficiency level indicated in the user's profile. The times in the caption files indicate the times at which the text will be displayed and a time at which the text will be removed from display. For example, a timeframe of 00:07:24.000→00:07:31.100 defines the start and end time of the caption text and the associated video segment that will be displayed. In one embodiment, if the system determines that the text is not likely to be read within the timeframe will be 00:07:24.000→00:07:31.100, then the text may be summarized. In other embodiments, if the system determines that the text is likely to be read within the time frame, then the system may leave the original captioned text unchanged.

In other embodiments, regardless of the amount of words in the caption text, the system may auto-summarize the words based on user's language proficiency level, user's profile, user's past consumption history of media assets, user's location, and other user online interactions. As such, the summarized text would be personalized and replace the words/phrases from the original caption text with personalized words, phrases, graphical representations familiar and user friendly to the user.

In another embodiment, the server may transmit a command to generate a user interface on a media device that is being used to watch the media asset. The user interface, such as the user interface described in FIG. 1 that is part of the user equipment 102, may be used by the user to make selections. The server may display a plurality of options to the user for turning closed captioning ON or OFF. As depicted in block 420, the user may use the user interface and select an option to turn ON the captioning and select a summary mode.

In yet another embodiment, the system may automatically turn on summary mode, such as in block 460, when it detects a rewind to playback the media asset. This auto summary mode in response to a rewind may be on a case-by-case, frame-by-frame basis, segment by segment basis, whenever a rewind is detected during the playback of a media asset. For example, the system may detect a rewind command for a segment of media asset that may be represented by a plurality of frames. If the number or rewind commands received either within a duration or anytime during the playback, exceed a threshold, then the system may determine if the rewind is related to additional time needed by the user for reading the captioned text, and if so, then automatically turn ON the summary mode and summarize based on user profile and other factors mentioned.

The user section summary mode 420 and original captions mode 430 are user selected modes 450 while auto-summary 440 and user behavior summary mode 460 are system selected modes 470 that are automatically selected by the system.

Referring back to block 350, if the summary mode is turned OFF, i.e., if the captions are turned OFF altogether, then the system displays the playback of the media asset without any captions. If captions are turned ON and summary mode is turned OFF, then the original captions are displayed along with the playback of the media asset and a summarized version is either not generated or not displayed.

At block 350, if the summary mode is turned ON, regardless of whether it is turned ON based on a user selection, such as in blocks 450, or turned ON by the system, such as in blocks 470 of FIG. 4, the system determines the user's language proficiency at block 370 to formulate a summarized text that is suitable based on the level of user's language proficiency. The system also determines if the user has identified their language proficiency level or selected certain preferences at block 380 that are to be factored in when generating the summarized text.

Figure 5A:
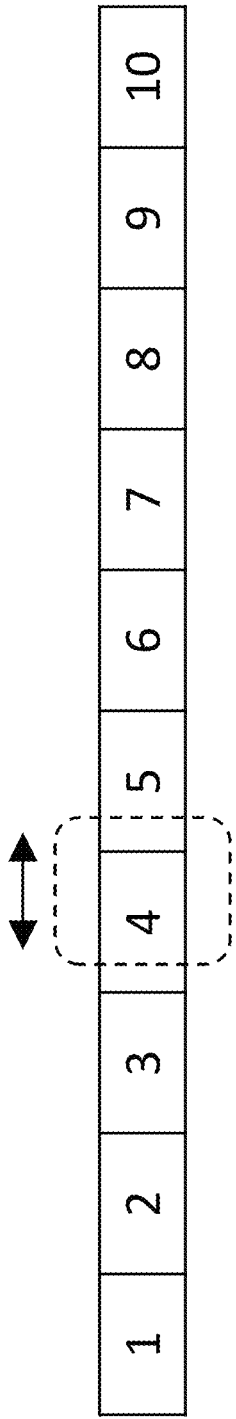
FIGS. 5A and 5B are block diagrams for selecting language proficiency level, in accordance with some embodiments of the disclosure.
Figure 5B:
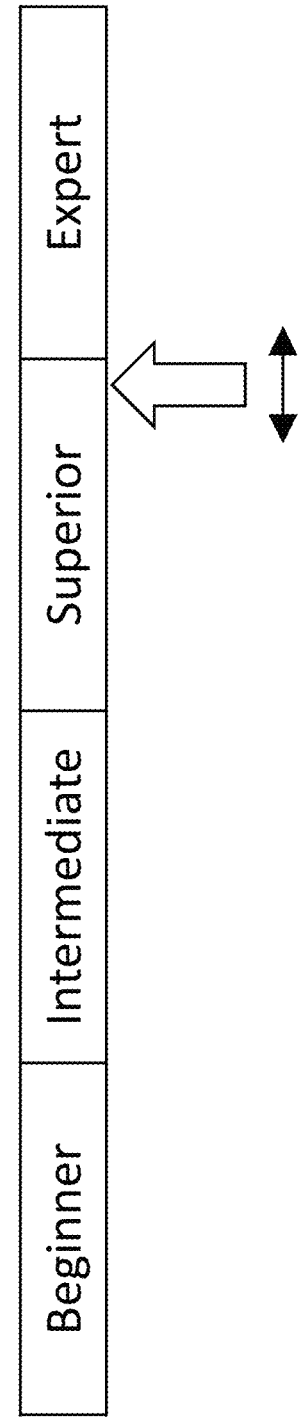

In one embodiment, the user interface may provide selectable options, such as a slider or a scale, that can be selected by the user to define their language proficiency level. For example, as depicted in FIGS. 5A and 5B, the user may select their language proficiency from a scale of 1 to 10. In another embodiment, the user interface may provide a different proficiency grading level, such as in FIG. 5B, where the user can self-identify themselves as a beginner, intermediate, superior, or an expert. In another embodiment, the system may auto select or define user's language proficiency level by selecting a level in either FIG. 5A or FIG. 5B. Although some exemplary proficiency scales are depicted in FIGS. 5A and 5B, the embodiment are not so limited and other proficiency grading scales are also contemplated.

Language proficiency levels can be determined based on several factors. For example, FIG. 6 is a block diagram 600 that depicts a plurality of categories or factors that may be considered in determining the summarized text for the media asset, in accordance with some embodiments. The consideration may be based on analysis of metadata associated with each category/factor.

As represented by block 610, the summarized text may be based on social media interactions 610 of the user. In this example, the user may authorize the system to access all its online accounts. Once authorized, when a user posts to an online account, comments on an online post, or performs other online textual or graphical social media interactions, a machine learning algorithm captures the data and uses it to develop a model. The model represents user social media history and determines the language, icons, emojis, and other graphics used by the user as an indicator of the user's language proficiency level and preferred words/phrases. The algorithm is enhanced based on the volume of data gathered and is trained overtime to predict with a higher probability the words/phrases that the user is comfortable with, or prefers, such that those words and phrases can be used when summarizing and replacing the captioned text. The machine learning algorithm may also be configured to periodically monitor all user communications to obtain a set of terms based on the user communications that can be used in summarizing caption text.

As represented by block 620, the summarized text may be based on user's consumption history of other media assets. In this example, the user may have watched other media assets previously in which captions were substituted with a summarized text. The machine learning algorithm captures the data from such previous media consumptions can uses it to summarize caption text.

As represented by block 630, the summarized text may be based on user's profile. The user may have set certain preferences in the user profile or defined their level of language proficiency. The machine learning algorithm captures the data from the user profile and considers it when summarizing the caption text.

As represented by block 640, the summarized text may be based on user's voice commands, or textual commands via a keyboard or touchscreen, that are inputted to operate functions of the media device or the user interface. Since some media devices allow commands through a voice input, such as through a remote control, or textual input through a keyboard or touchscreen, the machine learning algorithm captures the data from such interaction and uses the words and phrases, or graphical representations, as an indicator of user language proficiency and preferred words and phrases. The algorithm is continuously trained and enhanced based on the volume of data gathered and used when summarizing and replacing the captioned text.

As represented by block 650, the summarized text may be based on user's texts and multimedia messages, such as through the user's cell phone or tablet. The abbreviations, emojis, emoticons, used during texting are representative of summarized form of text that the user is comfortable and proficient in when communicating. Also, text input for the user's twitter account may be representative of the lesser characters used by the user to communicate a message. Twitter is a trademark owner by Twitter, Inc. Such text and twitter messages may be highly relevant when the caption text has a number of words that exceed the threshold limit of words that a user cannot reasonably read, or the specific user cannot read, within the start and end times of display of the associated video segment. Since characters in twitter are also limited, and user may type texts which are shorter form of full conversation, such input can be used by the machine learning algorithm to determine the type of text or lingo that is user friendly and comfortable to the user such that same or similar text can be used when summarizing the captioned text.

As represented by block 660, the summarized text may be based on user's feedback. For example, the user may provide feedback with respect to the current media asset or for previously viewed media asset by approving or rejecting terms that were replaced by the system. Such feedback may be used to further train the machine learning algorithm on the user's preferences.

Figure 7:
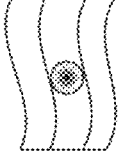
FIG. 7 is an exemplary replaced terms summary, in accordance with some embodiments of the disclosure.
Figure 7:

In one embodiment, the system may generate a list of all the terms replaced in the media asset such that the user can view the replaced terms summary and make any adjustments as needed. For example, FIG. 7 depicts an exemplary replaced terms summary that that can be generated by the system on the user interface. As depicted, the user is provided options to approve or reject the original captioned terms that were replaced or edited with a summarized term.

As depicted in FIG. 7, the first term "French Fries" was replaced by a summarized term "Chips." The replacement may be made on several factors as provided above. Although some factors have been described, the system is not so limited and other factors may also be used. In this example, the system may have recognized that the user's location is in a European country, potentially in United Kingdom ("UK"). In one embodiment, the system may determine the location of the user based on a GPS location of a mobile device associated by the user. In other embodiments, the location may be identified by the user or the system or determined based on the user's communications and transactions on social media or electronic devices associated with the user.

Based on the location, the system determines that French Fries are referred to as "Chips" in UK and as such may have replaced the term "French Fries" with "Chips." The system may also provide the user an option to approve or reject the replace term. In this instance, that user chose to reject the substitution of the term "Chips" for "French Fries." This may be because the user is used to the term French Fries or more comfortable with the term French Fries than chips even though the user is located in the UK. The data is fed into the machine learning algorithm such that it does not substitute the term chips for French Fries in the future.

As depicted in FIG. 7, the word "acknowledgement" was replaced by a summarized term "mention." The replacement may be made on any one of the several factors as described above. In this example, the system recognized that the user is comfortable with a related word "mention" and has used it more often in the same context. As such, the data is fed into the machine learning algorithm such that next time the word "acknowledgement" is depicted in the captions, it can be replaced with "mention." In another embodiment, the system may have determined the language proficiency level of the user and based on the determined language proficiency level determined that a simpler word, such as "mention," would be more suitable for the user. Additionally, the user had approved the substitution for the words and that feedback is used to further enhance and train the machine learning algorithm.

As depicted in FIG. 7, the word "India" was replaced by a graphical representation, which in this case is an icon of the Indian Flag. Other graphical representation of India may also have been used based on user's profile or previous history. The replacement may be made based on any one of the several factors as described above. For example, if the user previously substituted, or if the user simply used an icon of the Indian flag, when they meant to use the word "India," such as in social media interactions, previous consumption history, text messages, or user feedback, then the system recognizes that substituting the word India with an icon of the Indian flag would be acceptable to the user. Additionally, the user had approved the substitution for the words and that feedback is used to further enhance and train the machine learning algorithm.

As depicted in FIG. 7, the word "Hypocritical" was replaced by a summarized term "phony." The replacement may be made on any one of the several factors as described above. In this example, the system recognized that the user rejected the substitution and as such, the data is fed into the machine learning algorithm such that it does not substitute the term "hypocritical" with the term "phony" in future occurrences of replacing the caption text with the summarized text.

As depicted in FIG. 7, the phrase "She is happy today" was by a summarized by an emoticon showing happy face. As depicted the system has provided both options to approve or reject this emoticon and the user has not yet selected whether they approve or reject this summarized emoticon. However, once the user makes a selection using the user interface, the system would use that data to determine future substitutions when happiness is expressed.

Although FIG. 7 depicts a "V" (check mark) and an "x" (crossed out symbol) for the user to approve or reject a summarized term, other forms of approval or rejections, such as thumbs up or down, is also contemplated.

Referring back to FIG. 6, additional factors may be considered in determining which words and phrases to summarize and how to summarize them to the user's preferences. The factors and examples provided in FIGS. 6 and 7 are only a few examples and the embodiments are not so limited. Other factors and examples may also be considered in determining whether to summarize the caption text and what summarized form of text to replace it with. For example, the language proficiency can also be determined from a user's interactions with a virtual assistant (e.g., Siri, Alexa, etc.). The data obtained can be fed into the machine learning algorithm and that can be part of assigning a language proficiency value to a profile and then used for summarizing captioned words and phrases.

The information obtained through virtual assistants can be shared with respective video or media asset services and service providers (e.g., Siri information while watching content on iOS or Apple TV; Alexa info can be used while watching content within Prime Video., Netflix, Comcast etc.). (Netflix is a trademark owned by Netflix Inc., Alexa and Prime Video are Amazon Prime are trademarks owned by Amazon Technologies, Inc, and iOS and Apple TV are Amazon Prime is a trademark owned by Apple Inc.).

Additionally, a web-service can personalize the captions by suggesting or replacing specific sentences/words based on user's profile, preferences, and other factors discussed in FIG. 6. The process of summarizing can also be distributed between the server and a client or local player. For example, a local dictionary can be maintained at the client site that can accomplish the summarization and replacement of words with their contractions or abbreviations. For example, replace "I would" with "I'd," or replace "laughing out loud" with "LOL," etc.

Referring back to block 370 and 380 of FIG. 3, once the language proficiency level and user preferences are determined the process moves to block 390 where the methods and factors described in FIGS. 5A and 5B to FIG. 7 are used in determining which words, phrases, and sentences to replace from the caption file to summarize the displayed text such that it is personalized to the user and the number of words are reduced such that the user is able to read at their pace within the time frame when the associated video segment of the media asset is being displayed.

Figure 8:
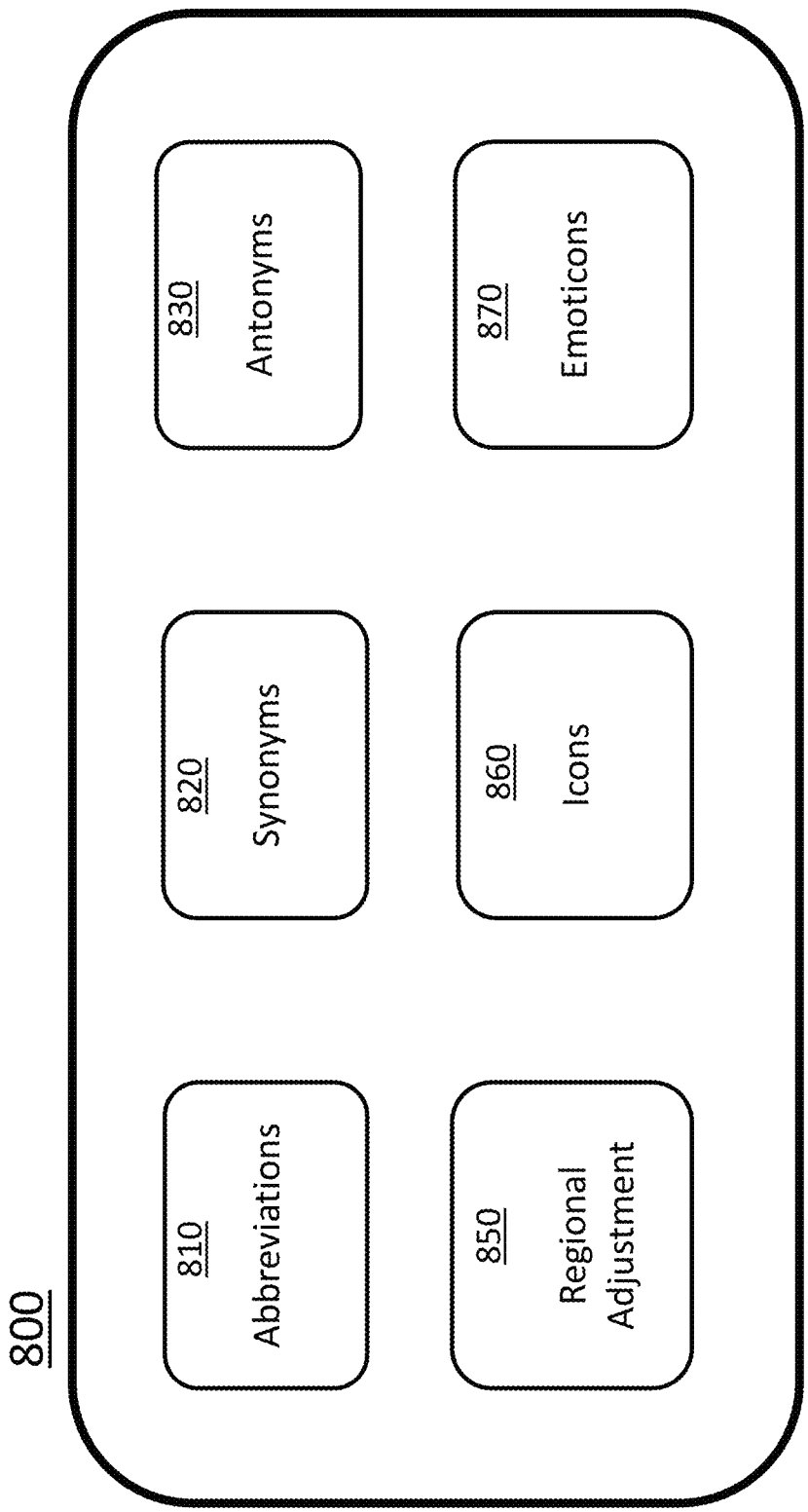
FIG. 8 is a block diagram of types of summarization categories, in accordance with some embodiments of the disclosure.

Some examples of the word and sentence summarization were depicted in FIG. 7. FIG. 8 is a block diagram of types of summarization categories, in accordance with some embodiments of the disclosure. These categories include abbreviations 810, synonyms 820, antonyms 830, regional adjustment 85, icon 860, and emoticons 870.

Abbreviations may include using letters such as "BRB" for "Be right back," "IMO" for "In my humble opinion," "OMG" for "Oh my God." Abbreviations may also be common business or industry used terms like "CEO" for "Chief executive officer," "ACL" for "Access control list," or "IP" for "Internet Protocol."

Synonyms such as automobile, car and vehicle, which contextually may mean nearly as same as each other but have differently levels of language proficiency associated with them, may also be used. Likewise, antonyms may also be used.

The summarized words may also be based on the region 850 or location of the user. For example, money or currency discussions may be summarized by a monetary sign that is relevant at the location of the user, such as "$" for U.S. Dollar sign is the user is located in the United States, a "£" for British Pound if the user is located in the United Kingdom, and a "₹" sign representing an Indian Rupee if the user is located in India. Likewise, sign for a measure of weight may also be represented by either the metric system (Kg for Kilogram) or U.S. Customary system (Lbs. for pound). Other regional or location adjustments include summarizing words in the form used locally in the country of the user. For example, "gasoline" may be referred to as "petrol" in some countries and an "elevator" may be referred to as a "lift." The machine learning algorithm would determine, based on at least some of the factors mentioned in FIG. 6 that the user resides in a certain country and as such adjust the summarization to use words that are more common in the country of residence.

In addition to regional adjustment, natural language processing (NLP) may be applied to determine the context and linguistic meaning of a caption such that a suitable summarized word can be used to replace the caption. For example, if the captioned text is "pound," then NLP may be applied to determine whether it is associated with a measure of weight "lbs" or a measure of currency, such as the British pound "£." As such, NLP may analyze other words, phrase, and sentences associated with the word pound to determine whether pound related to a measure of weight or currency.

Icons 860, emoticons 870, and other graphics may also be used to represent a word, phrase or sentence. For example, moods may be represented by an emoticon, company name, country names, or other recognizable names may be represented by their icons, common items such as a "printer" or a "computer" may be represented by an icon of a printer or computer.

The summarized sentence, phrase, or word may differ depending on the user's language proficiency. For example, as described earlier through the discussion of FIGS. 5A and 5B, the level of language proficiency may vary from 1-10 or a beginner to an expert and as such the abbreviations, synonyms, antonyms, summarizations based on locations, icons, and emoticons may also vary in degree to match the language proficiency of the user.

Figure 9:
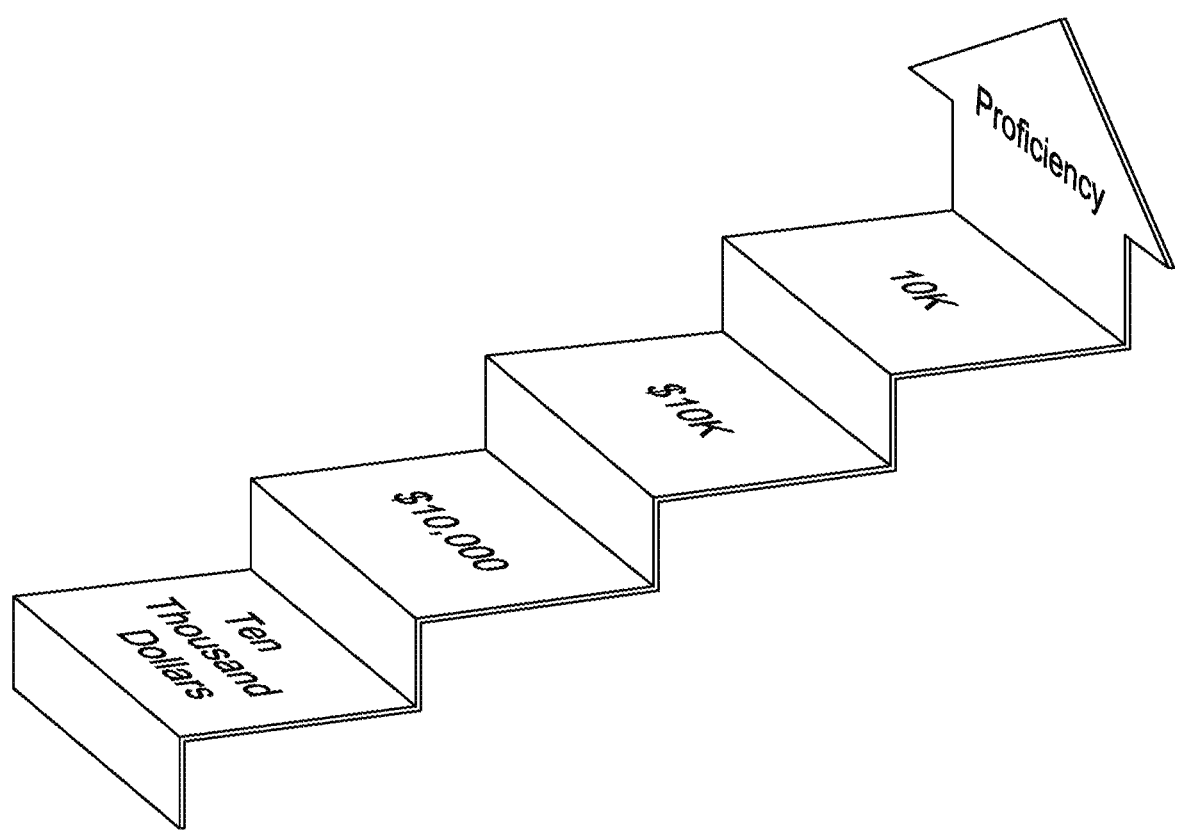
FIG. 9 depicts a plurality of summarization options based on the user's proficiency level, in accordance with some embodiments of the disclosure.

For example, FIG. 9 depicts a plurality of summarization options based on the user's language proficiency level, in accordance with some embodiments of the disclosure. In this example, the phrase "Ten Thousand Dollars" may be shortened and abbreviated to $10,000. Depending on the scale of the user's comfort level and language proficiency, it may be further contacted to $10K or just 10K. Likewise, words may be replaced by various degree of difficulty to match the user's language proficiency. However, if the user has indicated a preference for certain words in their profile or provided feedback in the past, such as through the user interface as described in FIG. 7, then the user's preferences would be used to summarize the caption text. As such, at block 390 of FIG. 3, the captioned text is replaced based on the language proficiency and user preferences as described above.

Figure 10:
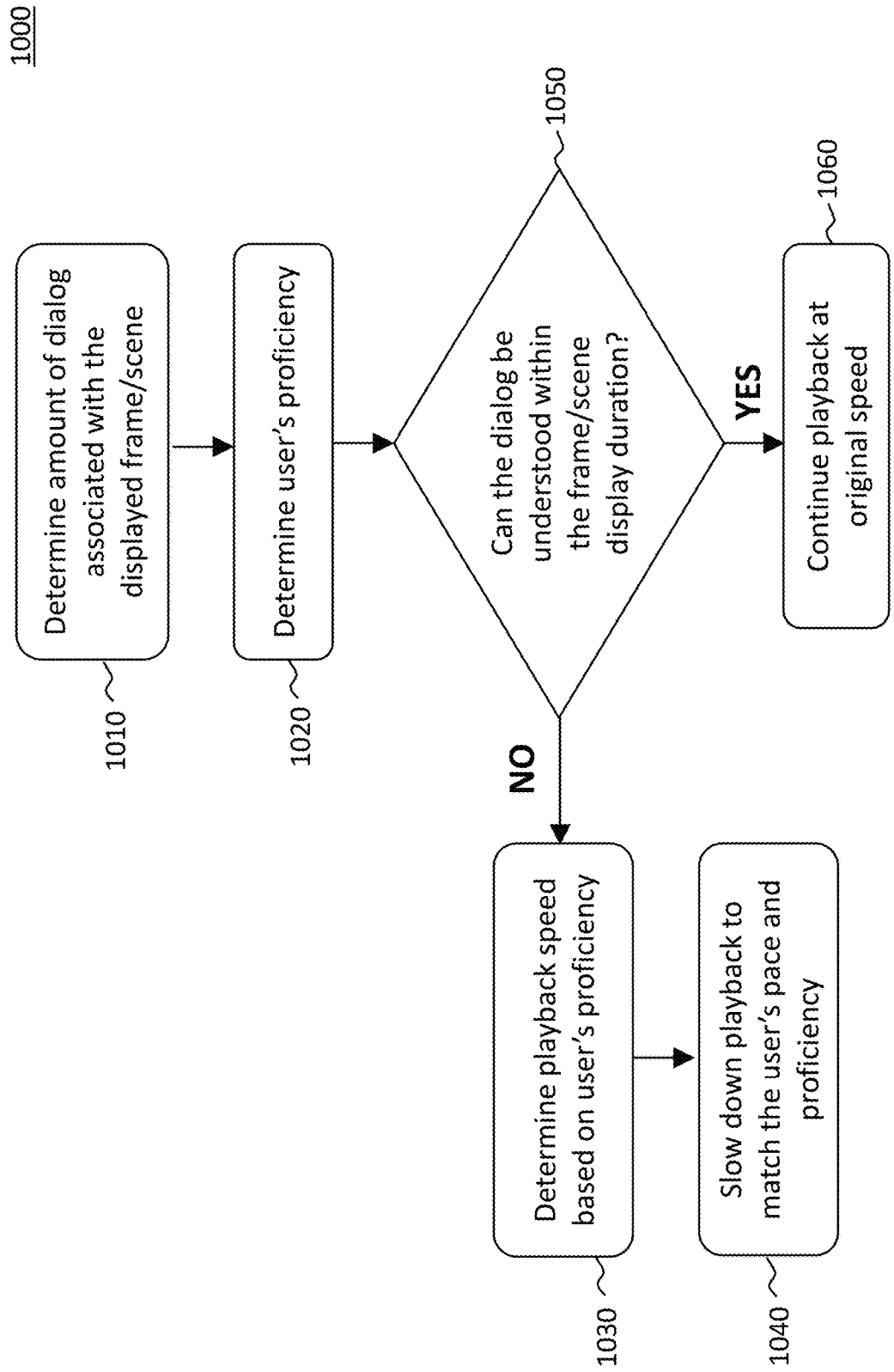
FIG. 10 is a flowchart of a process for configuring the playback speed of the media asset, in accordance with some embodiments of the disclosure.

FIG. 10 is a flowchart of a process for configuring the playback speed of the media asset, in accordance with some embodiments of the disclosure. Process 1000 may be used and implemented through systems and devices as described in FIGS. 1-2 to reduce the playback speed, or in some cases increase the playback speed, of the media asset. Process 1000 may be deployed if a caption file may not be available and as a result, there may be no captioned text available for summarizing. It may also be deployed when caption file is available, however, it may not be possible to convert the captioned text to a summarized text due to some reason. Under such circumstances, if the system detects that additional time is required for the user to hear and digest the dialog outputted, then the system may automatically slow down the playback speed of the associated frames associated with the dialog (e.g., normal to 0.75×), such that the user has adequate time to digest the dialog and other audible sounds presented through the media asset. The information to slow down the playback speed may be signaled to the media device prior to display of the media asset or prior to a segment of the media asset that needs to be played back in a slower speed. For example, a manifest file can signal such information for a specific segment or scene during live streaming or even while watching on-demand (if the subtitle file was parsed/processed before playback). Additionally, the media device can receive an updated manifest during playback. For example, the beginning of a movie might not have much dialogue and therefore that time can be leveraged to process the caption file and rewrite the caption file that can be referenced by the manifest file. This can be performed by including an additional tag that the player logic can understand (i.e., signal to the media device to automatically play a specific segment(s) at a slow speed).

At block 1010, the system may determine the amount of dialog associated with the displayed frame segment, or scene, i.e., are the characters talking throughout the frame or are there moments of lulls and lesser dialog? Since each frame, segment, or scene has its own associated dialog that gives context to the segment or scene displayed, e.g., the dialog is synchronized with its related scene, it is important that the user be able to comprehend and digest the dialog while the corresponding video segment or scene is being displayed. Otherwise, either the scene moves to the next scene and the user misses out on the full context of what happened in the previous scene, or the user ends up rewinding to playback the dialog thereby spending more time than needed. As such, the system determines the amount of time that the segment will be displayed by looking at the start and end times for the segment and determines whether the amount of dialog can reasonably be digested and understood within the frame/segment start and end times.

At block 1020, the system determines the user's understanding and comprehension pace and language proficiency. As described in earlier figures the pace and language proficiency can be determined based on a plurality of factors. In one embodiment, the system may also generate a sample test to determine the user's comprehension, understanding, pace and language proficiency level. Once the user's understanding and language proficiency is determined, at block 1050 the system determines whether the dialog can be understood within the associated video frame display duration.

If a determination is made at block 1050 that the user can understand and comprehend the dialogue within the display duration based on their language proficiency, then the process moves to block 1060 where the media asset is played back at his original speed.

If a determination is made at block 1050 that the user cannot understand and comprehend the dialogue within the display duration based on their language proficiency, then the process moves to block 1030 where a determination is made as to what playback speed would be appropriate based on the user's language proficiency to provide adequate time for the user to understand and digest the dialogue displayed.

At block 1040, the media asset playback speed is reduced to a speed based on the determination at block 1030 to accommodate for the user's language proficiency. For example, the system may slow down the playback speed of the associated set of frames (e.g., normal to 0.75× or a lower number). In one embodiment, the need to reduce the speed may be signaled to the system or media player ahead of time. For example, a signal or command for slowing down the speed during a specific scene when the media asset is being live streamed or even while watching on-demand (if the caption file was parsed/processed before playback) may be sent to a client media device such that when the scene is detected, the system automatically slows the playback speed.

Figure 11A:
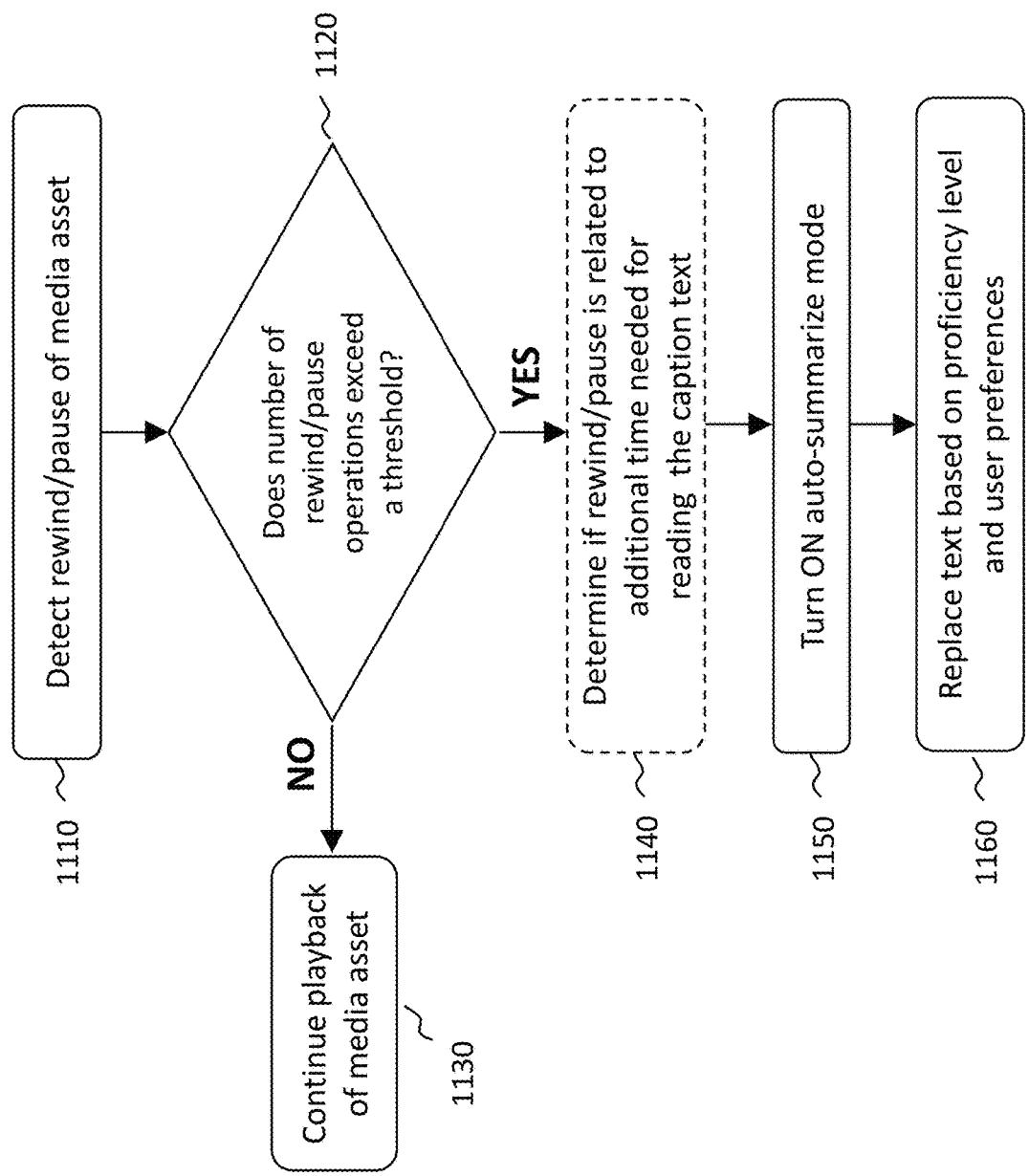
FIG. 11A is a flowchart of a process for automatically summarizing the captions when a rewind is detected, in accordance with some embodiments of the disclosure.

FIG. 11 is a flowchart of a process for automatically summarizing the captions when a rewind or replay command is detected, in accordance with some embodiments of the disclosure. The replay or rewind command may be received in response to the user making a selection on their remote control or touch screen that corresponds with a rewind operation. The system may associate multiple rewinds, or even a single rewind, with the user wanting to reread the caption text that exceeds a threshold limit and cannot be read within the time frame of the associated video frames being depicted. As such, the system detecting the rewinds may turn ON the auto-summarize mode.

At block 1110, the system may detect a rewind, or a replay command or selection made by the user. In response the system, or the server, may receive a rewind signal for rewinding the media asset to an earlier playback position. In another embodiment, the system may also associate a pause selection as indicative of a user requiring more time to read the captioned text presented on the display screen of the media device.

At block 1120, the system determines if the number of rewinds, or pauses, exceed a threshold. The threshold may be predetermined by the system or the user and used in determining if the rewind should be associated with the user requiring more reading time to read the captioned text, i.e., for example in situations where the time to read the amount of caption text exceeds the start and end times of the displayed video frames associated with the captioned text. The threshold may be 2 rewinds or 3 rewinds, or pauses, or a number that is predetermined.

If a determination is made that the number of rewinds, or pauses, exceed the threshold, then the rewind, or pause, is associated with a need to summarize the caption text and as such the process may move to block 1150. In some embodiments, the process may move to block 1140 to further determine if the rewind or pause is related to additional time needed for reading the caption text and distinguish it from a rewind that does is not for the purpose of reading the caption text. For example, artificial intelligence (AI) mechanisms and user behavioral data may be used in determining whether the rewind is associated with a need to auto summarize or simply to replay the media asset from an early playback point. In one embodiment, when the number of rewinds exceed a threshold, the system may calculate the number of words displayed in the captions and determine an average reading pace required to read the number of words displayed. The AI mechanisms may also use the user's profile or prior consumption data to determine if the user has rewinded other frames when the amount of text was the same number of words as the current text associated with the current rewind operation. The AI algorithm may also keep a log of all prior rewinds and the number of words that were displayed for each rewind to determine the specific user's reading pace.

At block 1150, once a determination has been made that the rewind is associated with a need to summarize the captioned text such that the user can read the caption text within the time frame of the associated video display, then the auto-summarize function is turned ON.

At block 1160, the captions are summarized based on the user's language proficiency, reading pace, and other factors mentioned in FIG. 6.

In some embodiment, once the auto-summary is turned ON, it may remain turned on until the user turns the auto-summary function OFF. In other embodiments, the auto-summary function may automatically turn OFF if a caption for a future frame does not need to be summarized.

In one embodiment, the process 1100 in response to a rewind or a replay command received may determine whether the replay or rewind command exceeds a threshold. For example, if the threshold is set as "2," then if the two or more rewinds are detected then the systems would determine that the threshold is met and as such generating a summarized version of the original captions. The system would then rewind the media asset to the start of the frame where the caption is to be displayed and then replay of the portion of the media asset along with summarized version of the set of captions. As such, the original captions would be replaced with the summarized version.

In one embodiment, the summarized version of captions would include all the speech and non-spoken sounds from the original captions. For example, if the original captions included background music, car screeching noise, or some traffic noise, then the summarized version would indicate that such a noise is being played in the background. In another embodiment, as shown in FIG. 11B, the only the spoken sounds, such as speech or dialog, would be summarized and non-spoken sounds would not be summarized. Since one of the goals of the summarized version is to provide an easier to read version that has the same message as the original captions; reducing background sounds would aid in removing such clutter and displaying a simpler and cleaner summarized version of the captions. Additionally, a user rewinding or requesting a replay of a scene is likely interested in the spoken captions of the scene and not so interested in the background noise or non-spoken sounds.

As depicted in FIG. 11B, the original captions from the original caption file 1170 contains the following dialog: "He communicated to me that he will be right back with the information." It also contains a caption that identifies the background sound, which is "Frank Sinatra song New York New York" that is playing in the background.

The summarized version of the caption file is depicted as block 1180. In one embodiment, the summarized version replaced the following original captions: replaced "communicated" with a simpler word "told," replaced the phrase "be right back" with "BRB," and shortened the word "information" to "info." The summarized version did not copy the original caption relating to "Frank Sinatra song New York New York" and it also did not copy the traffic noise that was coming from outside the window where the scene took place. The system can detect which captions are related to speech and which captions are related to background sounds. Thus, the summarized captions 1180 present a cleaner as well as summarized form of captions such that the user can read it quickly and more easily.

Figure 12:
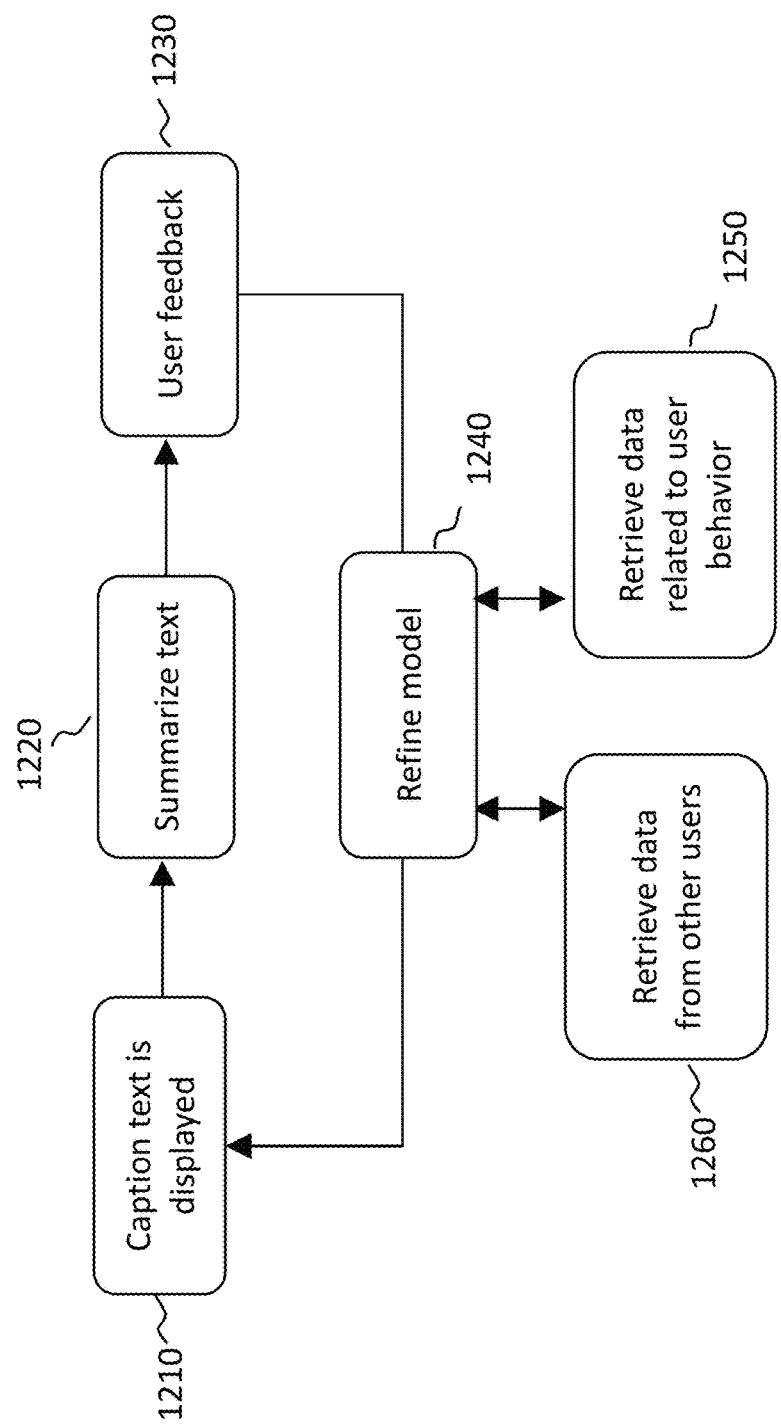
FIG. 12 is a flowchart of a process for training and refining a machine learning algorithm that can be used for summarizing the captions, in accordance with some embodiments of the disclosure.

FIG. 12 is a flowchart of a process 1200 for training and refining a machine learning algorithm that can be used for summarizing captions, in accordance with some embodiments of the disclosure. The machine learning algorithm can be applied to summarize caption text when either the user or the system turns on the summarization mode. When applied, the machine learning algorithm analyzes a word, phrase, or sentence to be summarized based on the user's historical data gathered over time. It may also analyze the word, phrase, or sentence to be summarized based other factors such as data from other designated users of the same household, friend's circle, or crowdsource data from other individuals that have common characteristics with the user.

In one embodiment, training and refining the machine learning begins at block 1210, where caption data is displayed on the media device. Once displayed the captioned data is summarized at block 1220. The summarizing, for example, can be performed by abbreviating a word, using synonyms or antonyms, using words or phrases previously used by the user, or use any of the summarizing options as described in the discussion of FIG. 6.

At block 1230, the system receives feedback from a user relating to the summarized text. In one embodiment, a server may transmit a command to generate a user interface that can be used for approving or rejecting words, phrases, and sentences summarized for a media asset.

The machine algorithm at block 1240 uses the user feedback from block 1230 to train and enhance the algorithm such that future summarizations are performed based on the feedback received from the user. For example, the machine learning algorithm may summarize the next set of video frames based on feedback provided on the previous set of video frames or summarize captions for the next media asset based on user feedback received for words, phrases, and sentences summarized for a previous media asset that was viewed by the user.

In another embodiment, the machine learning algorithm may retrieve data related to user behavior data at block 1250 and/or retrieve data from other users to further train and refine the machine learning algorithm. For example, at block 1250, the system may be authorized and provided access to all or some of user's online accounts and electronic devices. The system may also be provided access to servers, routers, and local hubs used by the user. Data relating to user's online interactions and electronic communications may be obtained by the system and fed into the machine learning algorithm. Some examples of data sources from which data can be retrieved to determine behavior are further described in the description associated with FIGS. 6 and 17. The machine learning algorithm may use additional tools, such as artificial intelligence tools, to analyze user behavior based on the user data obtained.

The results from the analysis may then be used to determine user preferences, user language proficiency, and develop a personalized user dictionary that can be stored in a database. Words, phrases, sentences, graphics, emoticons, and other abbreviations and language usage from the personalized dictionary may then be used to summarize the caption text thereby personalizing the captioned text to the specific user. In one embodiment, the personalized dictionary may include words, abbreviations, icons, emojis and other graphics, and other language use that are outside of the standard usage of terms, such as those that can be found in a standard dictionary, where the user is its own lexicographer.

At block 1260, the system may also retrieve data from other users, such as family members, friends in a social circle, or other individuals identified by the user. For example, the user, using the user interface, may identify their spouse or other family member as having same similar language proficiency and allow the system to use the family member's behavioral history and summarize captioned text based on the family member's proficiency level.

The system may also crowdsource data from a particular group and data from the particular group may be used in training and refining the machine learning algorithm. For example, in one use case, the system may identify co-worker at a company as a specific group and use technical terms used commonly in the group for summarizing captions relating to a work-related educational training media asset.

Figure 13:
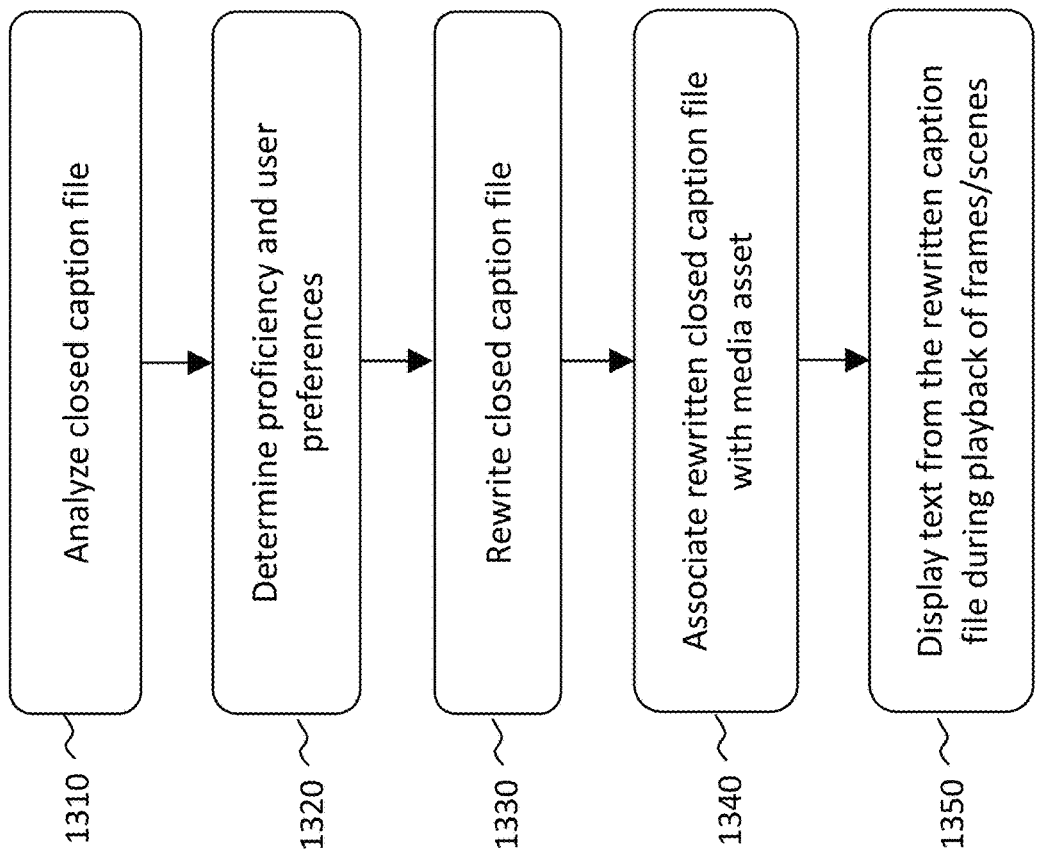
FIG. 13 is a flowchart of a process for rewriting the caption file, in accordance with some embodiments of the disclosure.

FIG. 13 is a flowchart of a process 1300 for rewriting the caption file, in accordance with some embodiments of the disclosure. The systems and methods used in description of FIGS. 1-12 may also be applied when rewriting a caption file.

In one embodiment, a caption file may be rewritten, and reference by the manifest file, based on the user's language proficiency and reading pace, such as, for example, based on categories described in FIG. 6. Rewriting the caption file includes summarizing the captioned text. The caption file may be rewritten before, during, or after the media asset is viewed. It may also be rewritten when a media asset is placed into a user playlist.

For example, the caption file may be rewritten prior to the viewing of the media asset. A user may select the media asset to watch or may schedule a time to watch the media asset at a future time. The system may receive the user's indication to watch the media asset and use the methods and tools described above to rewrite the caption file before the media asset is played back.

The caption file may also be rewritten after the user has selected the media asset to be played and during the earlier portions of the media asset or anytime during the playback. For example, the system may determine to rewrite the caption file while the initial credits are being played back or during the starting few minutes of the media asset. The caption file may also be rewritten after the user has viewed a media asset such that captions are summarized for a future viewing of the same media asset. For example, a family member may determine after watching a media asset that another family member whose language proficiency and reading pace is different from the user can benefit from the rewritten caption file.

The caption file may be automatically rewritten based on receiving an indication that the user is currently consuming the media asset or will be consuming the media asset at a future scheduled time. It may also be rewritten when a user may select options using the user interface to initiate such rewriting. In another embodiment, the system may predict what the user is likely to watch and automatically rewrite the caption file. For example, if the user is watching a series and has watched a threshold number of episodes of the same series, then the system would predict that the user is likely to watch additional episodes of the same series and automatically rewrite the files for the unwatched episodes. In another example, if the user has consumed an episode or a movie that has additional sequels, then the system may automatically rewrite the caption files for all the remaining episodes and sequels since it is likely that the user may watch them later.

The system may also determine based on user's electronic communications of online activity that the user is likely to watch a particular media asset and automatically rewrite the file prior to the playback of the media asset. For example, since the system is granted access to the user's electronic communications and online activity, a message from the user, such as for example, a text or a posting on a social media channel, where the user expresses an interest in watching a media asset may be obtained by the system and used as a trigger to rewrite the caption file prior to its playback.

In one exemplary process, the rewriting of the caption file begins at block 1310. The closed caption file is analyzed by the system. The analysis includes determining the number of words for each frame in context with whether the number of words exceed a threshold limit for its associated frame or plurality of frames. For example, if the number of words captions for the associated frame requires an average user 6 seconds to read them, and the frame duration based on its start and end time is 4 seconds, then the system determines that the number of words exceed the threshold and cannot be read within the display of the associated video frame. As such, the system may determine that the captioned text is to be summarized such that it can be ready within the time frame of the associated video frame being displayed, i.e., within 4 seconds. The analysis may also determine complex words, including longer words that use a larger number of alphabets, that are used in the media asset and determine that such words can be summarized to be read more easily and within the time frame of the associated video frame.

At block 1320, the system determines the language proficiency of the user and their preferences. The system may also determine the user's reading pace. As described in the discussion of FIGS. 5-9, various methods may be applied and factors considered to determine the user's language proficiency, reading pace, and preferences. The system may also use machine learning and artificial intelligence tools and algorithms to determine user behavior and use data based on user behavior to determine user's language proficiency, reading pace, and preferences.

In one embodiment, the system may generate a sample test and display the test on a user interface to evaluate the user's language proficiency level and reading pace. The test may include a variety of words, phrases, sentences, sentence structures, grammatical structures, abbreviation, symbols, emoticons, and other combination of characters. The test may be timed to determine whether the user can read the provided captions within the allotted timeframe. A survey at the end of the test may also be used to obtain user feedback on the terms used in the test. The user's language proficiency level and reading pace may be assigned based on the results of the test and/or the survey and other feedback.

As described earlier, the system may also generate a personalized dictionary that is specific to the user than can be used in summarizing and rewriting the caption file. The personalized dictionary may be a set of words, phrases, sentences and other characters that are familiar to the user based on prior history or selected based on the language proficiency of the user.

At block 1330, the system may rewrite the caption filed based on the user's language proficiency, reading pace, and preferences and may also retrieve the personalized dictionary from a database to summarize the captioned terms. Once rewritten, the rewritten caption file may consist of terms (words, phrases, sentences, icon, and other graphics) that are customized to the user.

At block 1340, the rewritten caption file may be stored in database and associated with the media asset. In one embodiment the system may replace the original caption file with the written caption file and in another embodiment the system may store both files and allow the user to multiplex and switch between files, or use some combination thereof, as needed.

At block 1350, the rewritten caption file may be used instead of the original caption file. As such, when the media asset is consumed, the text that is summarized in the rewritten caption file may be used instead of the original captioned text.

FIG. 14 is an exemplary playlist of a user, in accordance with some embodiments of the disclosure. In one embodiment, the process 1300 of FIG. 13 can be applied to a playlist selected by a user. For example, the user may have seen a preview or a trailer of a media asset and "liked" the trailer thereby adding it to the user's playlist. In other embodiments, the user may have selected specific media items and added them to the user's playlist for future viewing.

For example, as depicted in FIG. 14, the user's playlist may contain movies, documentaries, news programs, educational tutorials, and private media assets that are internal to company X's employees, such as a training video or latest human resources policies. The user may edit the playlist over time and add or delete media items as desired. A server may transmit a command to generate a user interface, which may be used by the user to populate the playlist. The playlist may be stored locally or at a server of the systems described in FIGS. 1 and 2. Access to the playlist may be provided to such systems and process 1300 from FIG. 13 may be applied.

In one embodiment, once a playlist is populated, the system recognizes that these are media asset that are to be viewed at some future time. As such, the system rewrites the caption files for all the media assets in the playlist such that the rewritten caption files, which are summarized based on the user's language proficiency, reading pace, and other factors described in the discussion of FIG. 6, are displayed when the media asset is displayed.

In one embodiment, the system may rewrite the caption file for the playlist when the media item is added to the playlist. In another embodiment, the system may rewrite the caption file at the time of display, and in yet another embodiment, the system may configure on its own or based on user preference the best time to rewrite the caption file. For example, since the system is provided access to the user's devices, the system may detect based on a GPS location of the user's mobile device that the user's location is away from the media device that is regularly used by the user to watch the media assets, and, as such, the user may utilize the away time to rewrite the caption files. The system may also determine that the user is currently consuming one of the media assets and use the time to rewrite caption files for other media assets in the playlist that are not being watched. Regardless of the timing of when the caption files for the media assets is rewritten, which can vary and can be customized, once caption file is rewritten, it is displayed when the media asset is consumed instead of the original caption file.

In one embodiment, the system may store the rewritten caption file in a database and transmit the rewritten caption file as a content stream, along with the associated media asset, to the user's device when the media asset is displayed. In another embodiment, the system may store both copies of the original caption file and the rewritten caption file and multiplex between the files to determine which file is to be streamed to the user device based on either user or system selection. For example, if the user turns OFF summary mode in a user interface, then the original caption file is streamed to the user's media device and if the user turns ON summary mode in a user interface, then the rewritten caption file is streamed to the user's media device. Other factors mentioned above may also be used to determine which file to stream to the user.

FIGS. 15 and 16 are exemplary portions of caption files, in accordance with some embodiments of the disclosure. As depicted in FIG. 15, the caption file includes a start and end time of a video frame, e.g., "begin='0.76 s' end='3.45 s.'" The dialog associated with the video frame is: "It seems a paradox does it not." The dialog is displayed within the 0.76-3.45 seconds time frame while the associated video frame is displayed.

Other audible noise, such as tires screeching and people screaming, shotgun blasts, as depicted in FIG. 16, may also be included in the caption file. Some video frames may include a larger number of captioned words, such as in FIG. 16 lines 2 and 4 while other video frames may include lesser number of words, such as in FIG. 16 line 3. Since speech and audible sounds are associated with a particular scene displayed through a single or plurality of video frames, the system may summarize such that it is customized based on the user's language proficiency, reading pace, and preferences so its user friendly and can be ready within the time frame of the associated video frame being displayed.

Figure 17:
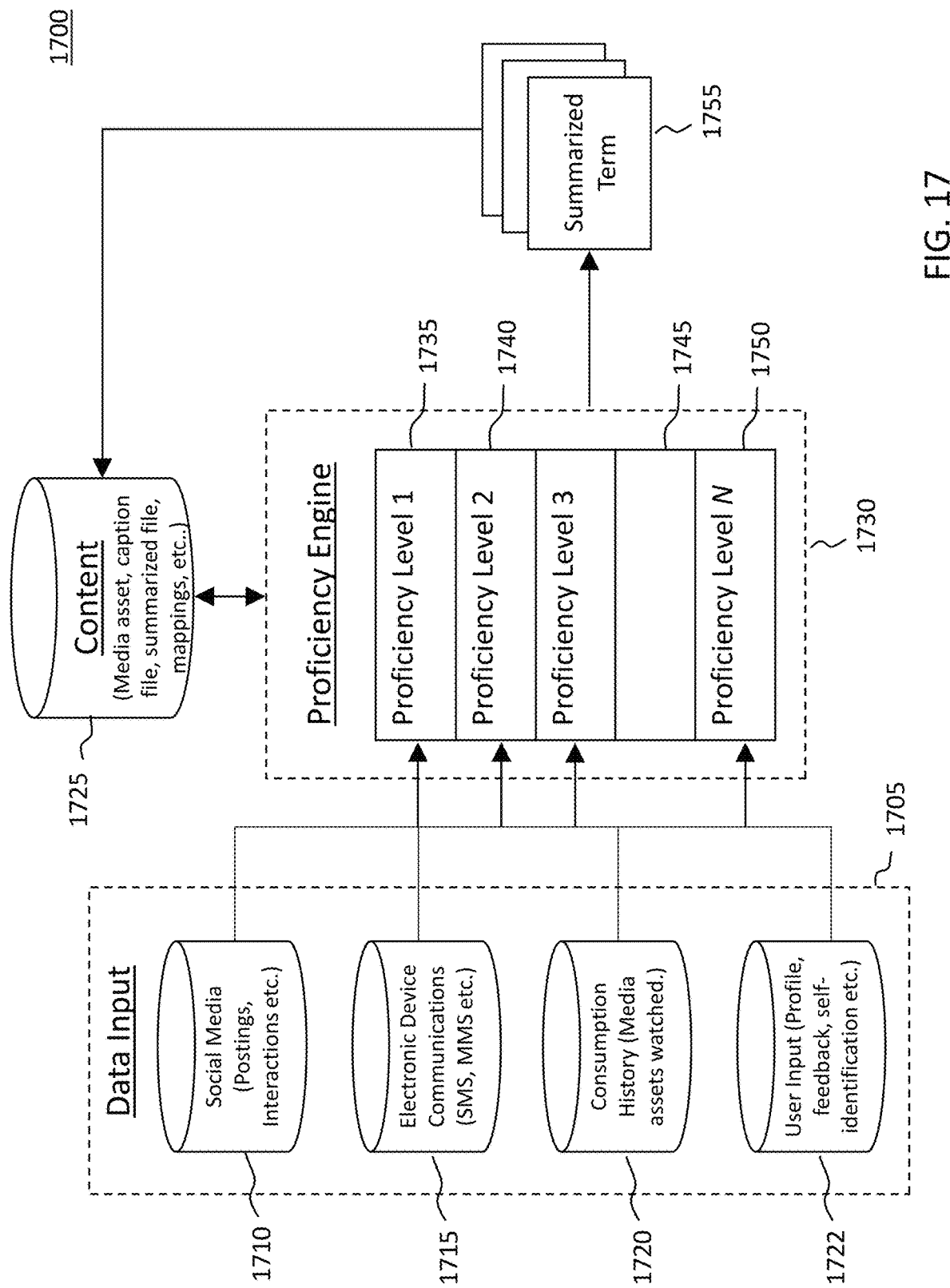
FIG. 17 is a diagram of information flow into a proficiency engine to generate a summarized term, in accordance with some embodiments of the disclosure.

FIG. 17 is a diagram of information flow into a proficiency engine to generate a summarized term. The input to the information flow is from sources 1710-1722, and other sources described in FIG. 6. Terms from the sources are used to determine a language proficiency level and the language proficiency level is used to determine a summarized term to replace or reword the original caption. The terms from the sources may be words, phrases, sentences, and other forms of word/sentence structures.

In process 1700, the proficiency engine inputs 1710-1722 include social media inputs 1710 and terms associated with the user's interactions on social media. For example, these terms are posting made by the user on social media platforms, including the user's response to messages, posts, comments, and their own postings.

The proficiency engine input also includes electronic device communications inputs 1715. These inputs may include communications of the user using electronic devices associated or owned by the user. For example, the user may be associated with mobile phone, a tablet, a gaming device, a remote control, laptop computer, or another type of electronic communication device. The inputs from the devices may be SMS and MMS texts, postings, messages, emails etc.

The proficiency engine input also includes consumption history inputs 1720. These inputs may include comments made in reference to consumption of media assets. The inputs may also include approval of summarized terms from previously watched media assets.

The proficiency engine input also includes user inputs 1722. These inputs may include user's profile that has been populated by the user, user's self-identification of a language proficiency level, or user feedback on approval or rejection or previously summarized terms.

The proficiency engine inputs 1705 are analyzed by the proficiency engine 1730, along with content 1725. The content 1725, which is a caption file containing a set of captions, may be obtained from content source 112 in FIG. 1.

The proficiency engine 1730 may receive and analyze inputs 1705 in several ways. In some embodiments, proficiency engine 1730 uses inputs 1705 to determine language proficiency level 1735-1750. In one embodiment one of the inputs may be used to determine a language proficiency level and, in another embodiment, a weighted combination of inputs from all input sources 1710-1722 may be used to determine the language proficiency level.

In one embodiment, a language proficiency level is determined based on the type of terms previously used, such as by analyzing inputs 1710-1722 and blocks represented in FIG. 6. For example, if 1715 is used as an input, an artificial intelligence (AI) algorithm is used to determine the user's level of proficiency with the language used in the caption file. As such, in one embodiment, the language used in the caption file is determined. For example, the language may be English, Hindi, Spanish, French, Arabic, or a dialect of a specific language.

The user's proficiency level is determined for the language that is used in the caption file. For example, some of the factors the proficiency level is analyzed to determine are: whether the user is proficient in grasping the caption language, whether the user can read the caption language within a certain time frame, are the words, phrases, and sentences used in the captions user friendly and easy to ready for the user?

Input 1715 is analyzed for the language of the caption file by determining the type of words, phrases, sentence, grammar, sentence structures, abbreviations, and other terms and symbols, such as those described in FIG. 8, are used by the user, such as for example, when the user is texting using their mobile phone. The AI algorithm analyzes such terms used and places them into different language proficiency levels. The levels may be different word usages of the same term. For example, the word "truthfulness," "candor," "trustworthiness," "honesty," "honest," and "trust" may all be used in the same context, however, the level of complexity, number of alphabets used in each word, the grammatical use of the word, the construction of the sentence structure, and abbreviations used, for example, may all be factored for determining a language proficiency level based on the word, phrase, and sentence usage by the user. As such, each language proficiency level may use a variant of the same term, but with a different complexity, different number of alphabets used. As depicted in FIG. 9, a user that uses the phrase, "Ten thousand dollars," may be associated with a lower language proficiency level than a user that uses "10K." The system may also automatically analyze use of terms from inputs 1720 or some other system generated factors to assign a particular proficiency level to the user.

Once a language proficiency level is determined by the proficiency engine 1730, the caption file is analyzed in light of the language proficiency level to determine a suitable term that can replace or reword the terms used in the caption file. Using the same example, above, if the proficiency engine detects a phrase "Ten thousand dollars" in a caption associated with a particular frame, and the user is associated with a high language proficiency level, meaning the user has a strong grasp of the language, then the phrase "Ten thousand dollars" may be replaced with "10K." If the user's language proficiency level is determined to be one or two levels below the highest language proficiency level then, "$10K," or "$10,000" may be used instead. Likewise, different word substitutions that vary in complexity and alphabets may also be used based on the language proficiency level assigned.

The proficiency engine may output a summarized term 1755 for the caption term received from the content 1725 input. As described earlier, the proficiency engine 1730 may analyze the caption term, or set of caption terms, and determine whether the caption is to be replaced, and if so, which summarized term should be used to replace the caption term based on the user's language proficiency level and select a suitable summarized term for output.

The summarized term or terms 1755 may be stored in a database associated with the content 1725. In one embodiment, a library of summarized terms may be generated and stored with the content 1725 such that a caption term can be analyzed and replaced with the summarized term at any point in the timeline display of the media asset or prior to and after the display. The summarized term library may also be used to rewrite the entire caption file, such as when a media asset is selected, scheduled for display, or placed in a playlist.

In one embodiment, the proficiency engine may analyze each term of the caption file. In other embodiments, the proficiency engine may analyze only selected terms from the caption file as described further in context of FIG. 18. For example, the proficiency engine may analyze terms that exceed certain number of alphabets, such as four alphabets, or related to primary objects.

Figure 18:
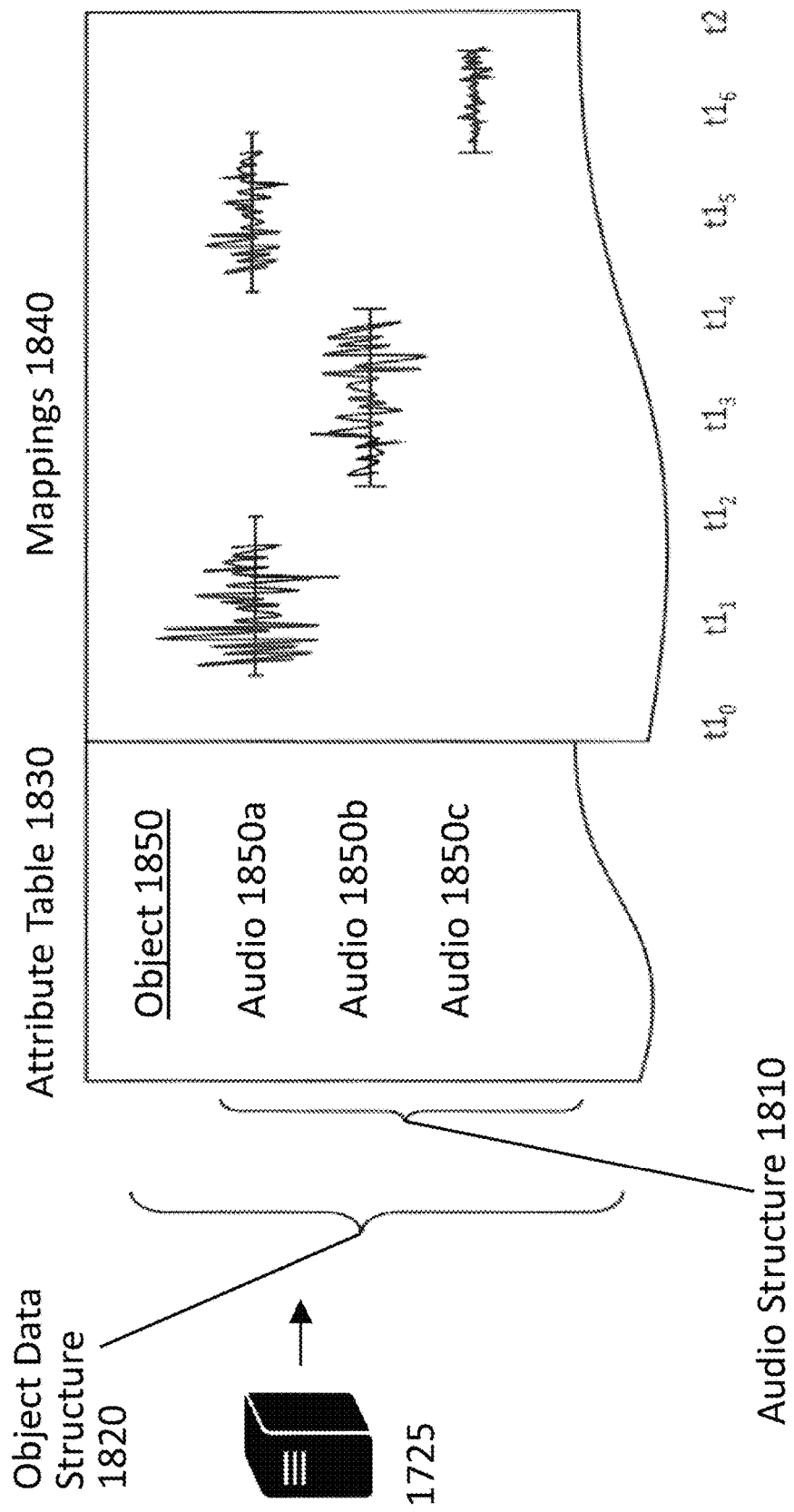
FIG. 18 is an exemplary content structure of a video frame/segment over a course of time t1 to t2, in accordance with some embodiments of the disclosure.

FIG. 18 is an exemplary content structure for a video frame over a course of time t1 to t2, in accordance with some embodiments of the disclosure. The content structure 1800 includes an attribute table 1830 generated from video frame of the media asset. The content structure 1800 also includes a mapping 1840 for each object in the attribute table 1830. The audio structure 1810, which is part of the object data structure 1820 that contains video mapping and other mapping of the video frame of the media asset, contains audio information generated by or associated with an object.

In one embodiment, the audio track 1850*a* may represent dialogue spoken by the object; audio track 1850*b* represents the sound of music playing in the background; and audio track 1850*c* may represent traffic noises coming from a window shown in the video framer. Each audio track 1850*a-c* may further list attributes including audio type, frequency, pitch, melody, volume, lyrics, instrument, voice signature, etc.

Referring back to FIG. 17, the proficiency engine may analyze objects 1850*a-c* in the attribute table 1830 and their associated mappings 1840. The analysis may be performed to determine which object is to be summarized. In one embodiment, the proficiency engine may summarize all objects 1850*a-c* and in another embodiment, the proficiency engine may select an object to summarize and not summarize all objects. For example, the proficiency engine may not want to summarize non-speech or dialogs objects, such as object 1850*b*, which related to background music, and 1850*c*, which relates to traffic noise such that a summarized version is not cluttered with non-spoken objects.

In one embodiment, if object 1850*a* is selected, the proficiency engine may then lookup a summarized term that is contextually similar that can be used to describe the object based on the user's language proficiency level. If a summarized library of terms is generated, then the proficiency engine may look-up a suitable summarized term for the object.

Object that are to be summarized may be selected based on several factors. For example, these would include, length of the word or phrase associated with the object, whether the object is a conjunction, such as an "and," "or," "but," or an article, such as "a," "an," or "the," complexity of the word, whether the word is associated with a primary object or a secondary object, if the word is essential to the sentence structure, whether the meaning provided by the word is specific or generic such that other substitutions can be made to convey the same meaning. Primary object may be related to the keywords of the dialog that are essential in understanding the context. Secondary object may not be as important or relevant to the context as primary objects.

In one embodiment, the captions that do not fit the factors may not be analyzed. In other embodiments, some of the terms that fit the factors may still be summarized. For example, the word "and" may be replaced with a symbol "&."

Figure 19:
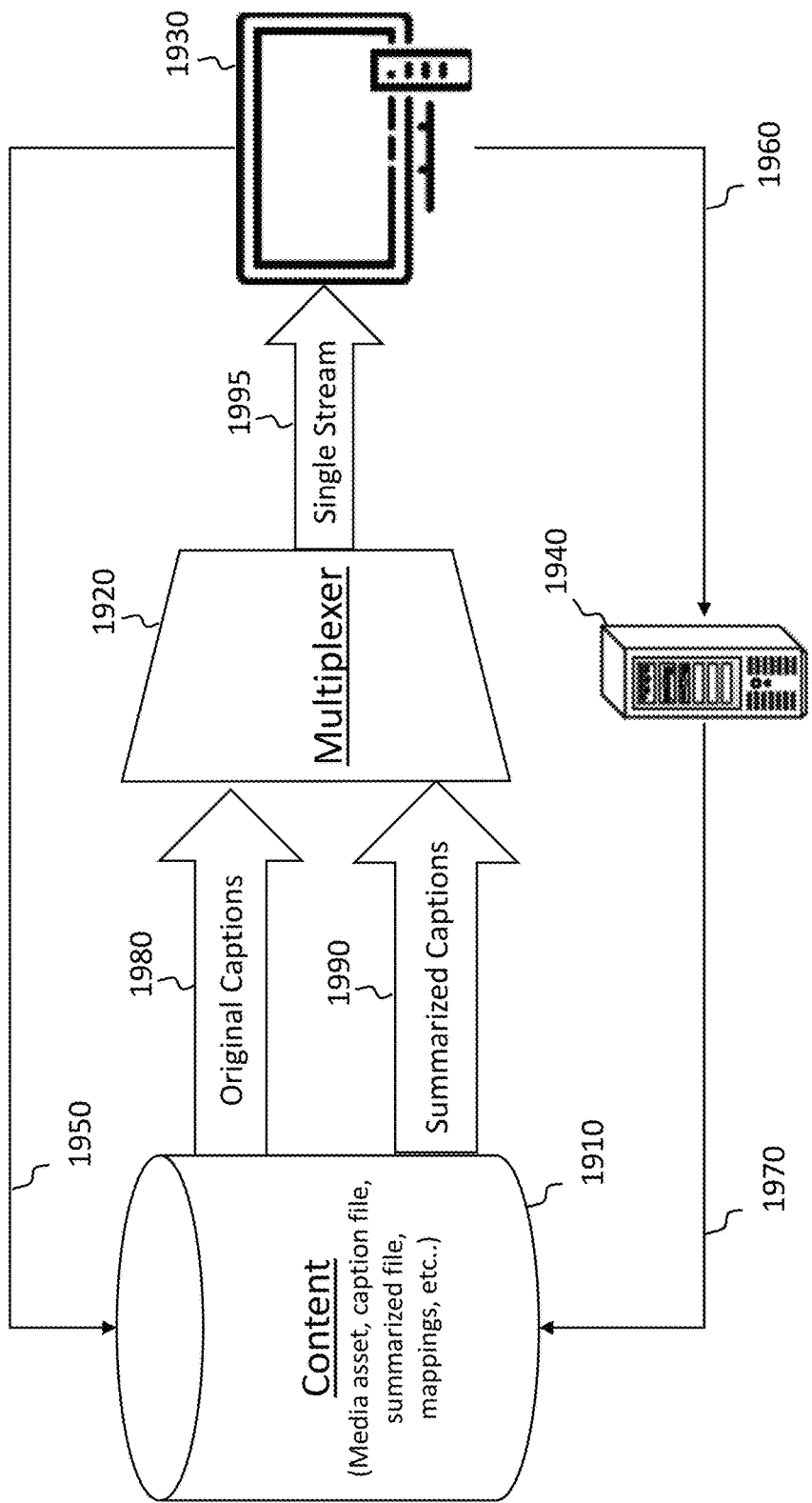
FIG. 19 is a flow diagram for multiplexing between different types of caption streams, in accordance with some embodiments of the disclosure.

FIG. 19 is a flow diagram for multiplexing between different types of caption streams, in accordance with some embodiments of the disclosure. The system in FIG. 19 includes a content database 1910, a multiplexer 1920, a media device 1930 having a user interface, and one or more servers 1940. The system 1900 may provide for delivering the original caption content, the summarized captions using the rewritten caption file. It may also provide a combination on a frame-by-frame basis. The caption file may be sent along with the media asset or separately as a "side car" file to the media device.

The content provider may obtain the original caption file, the summarized captions, or the rewritten caption file from its database 1910. It may then unicast or broadcast the media asset along with a selected caption file to a media device 1930. In one embodiment, selection of the caption file may be in response to a request 1950 received from the media device 1930. In another embodiment, it may be in response to a request received either directly from a system server 1940 or from the media device 1930 through the system server 1940. The request may be for an original caption file, a rewritten caption file, or summarized terms for certain captions on a frame-by-frame basis.

A multiplexer may select the original caption file, a rewritten caption file, a combination thereof, or summarized terms for certain captions on a frame-by-frame or segment-by-segment for the specific user associated with the media device 1930. The selected file or summarized terms may then be transmitted to media device to display with the media asset.

Multiplexing controls may be embedded inside content streams, such as caption stream 1980, or summarized caption stream 1990. Since the content stream may contain instructions for multiplexing, a multiplexer may then simply react to those instructions, switching between the stream to select the desired caption file in real-time. For example, in response to a media asset placed in a playlist, the rewritten caption file may be inserted into the content stream. As such, a multiplexer receiving both the caption content and the summarized caption content may send both versions of the caption content to the media device. In an embodiment where both the original captions and the summarized captions are sent, the captioned data is marked accordingly such that a decoder at the media device can parse the appropriate caption or rewritten caption content based on the user or system selection.

In some embodiments, a multiplexer for a given user may receive separate feeds with number of sets of frames, some with original captions and some with summarized captions. Each feed may include multiplexing instructions for how that particular feed should be combined with another feed to send one combined stream to the media device. The multiplexer may select either the caption stream 1980, summarized caption stream, or some combination based on those multiplexing instructions and then transmit the selected stream to the media device. The multiplexer may select content from content database 1910 or form a local storage.

For example, the multiplexer may receive a subset of the set of original captions relating to a first plurality of video frames and receive a summarized version of the set of the original captions for a second plurality of video frames. For simplicity's sake, assume that the 1st set of frames are contextually immediately prior to the second set of video frames in a story timeline. If that is the case, then the multiplexer would sequentially be combining the original captions for the first plurality of video frames and the summarized version of the original captions for the second plurality of video frames to generate a combined caption stream. If the set of frames are father apart in the timeline, the multiplexer would take that into consideration and generated a combined single stream of video feed that does not have an overlap of captions and arranged in an order that contextually follows the storyline of the media asset, i.e., the caption and summarized caption text is synchronized with the video feed so it can be displayed while its associated video is displayed.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
   determining display of a first media asset on a media device;
   summarizing a captions file associated with the displayed first media asset based on a language proficiency level of a user consuming the first media asset, wherein the language proficiency level is determined based on factors external to the first media asset;
   receiving user feedback based on the summarization of the captions file associated with the first media asset;
   determining that the user has placed a second media asset in a playlist to be consumed at a later time; and
   rewriting a captions file associated with the second media asset at a time when the second media asset is placed in the playlist prior to its consumption by the user, as a rewritten captions file, wherein the rewritten captions file associated with the second media asset incorporates the user feedback received for the summarization of the captions file for the first media asset.

2. The method of claim 1, further comprising:
   receiving a selection of the second media asset for display; and
   in response to receiving the selection of the second media asset:
      transmitting a manifest file to the media device, wherein the transmitted manifest file references the rewritten captions file associated with the second media asset.

3. The method of claim 2, wherein the received selection of the second media asset for display includes a request to display a segment of the second media asset; and
   in response to receiving the request to display the segment of the second media asset:
      delivering the segment of the requested second media asset and its corresponding rewritten captions that are referenced by the manifest file to the media device for display.

4. The method of claim 2, further comprising:
   determining whether corresponding rewritten captions for a segment of the requested second media asset can be read within a start and end time of the segment; and
   in response to determining that the corresponding rewritten captions for the segment of the requested second media asset cannot be read within the start and end time of the segment:

further summarizing the corresponding rewritten captions for the segment of the requested second media asset, wherein the further summarization is a shorter description of the captions file than the corresponding rewritten captions file that can be read within the start and end time of the segment.

5. The method of claim 1, further comprising:
accessing a GPS location of the user's mobile device;
determining based on the accessed location that the user is currently away from the media device; and
rewriting the captions file associated with the second media asset while the user is away from the media device.

6. The method of claim 1, further comprising:
determining that the user has placed a third and a fourth media asset in the playlist;
determining that the third media asset is currently being consumed by the user and the fourth media asset is not being currently consumed; and
in response to the determination that the fourth media asset is not being consumed, rewriting the captions file for only the fourth media asset.

7. The method of claim 1, wherein the factors external to the media asset include any one or more of the user's social media interactions, the user's text messages, and the user's geographical location.

8. The method of claim 1, wherein summarizing the captions file associated with the displayed first media asset further comprises, replacing or rewording a caption with a user defined term, synonym, antonym, abbreviation, symbol, emoji, emoticon, icon, or an image.

9. The method of claim 1, wherein the user feedback based on the summarization of the captions file associated with the first media asset is received in response to the user consuming the summarized captions file displayed during playback of the first media asset.

10. A system comprising:
communication circuitry configured to access a database that stores a first media asset and a media device for displaying the first media asset for a user; and
control circuitry configured to:
determine display of the first media asset on the media device;
summarizing a captions file associated with the displayed first media asset based on a language proficiency level of the user consuming the first media asset, wherein the language proficiency level is determined based on factors external to the first media asset;
receiving user feedback based on the summarization of the captions file associated with the first media asset;
determine that the user has placed a second media asset in a playlist to be consumed at a later time; and
rewriting a captions file associated with the second media asset at a time when the second media asset is placed in the playlist prior to its consumption by the user, as a rewritten captions file, wherein the rewritten captions file associated with the second media asset incorporates the user feedback received for the summarization of the captions file for the first media asset.

11. The system of claim 10, further comprising, the control circuitry configured to:
receive a selection of the second media asset for display; and
in response to receiving the selection of the second media asset:

transmit a manifest file to the media device, wherein the transmitted manifest file references the rewritten captions file associated with the second media asset.

12. The system of claim 11, wherein the received selection of the second media asset for display includes a request to display a segment of the second media asset; and
in response to receiving the request to display the segment of the second media asset, the control circuitry configured to:
deliver the segment of the requested second media asset and its corresponding rewritten captions that are referenced by the manifest file to the media device for display.

13. The system of claim 11, further comprising, the control circuitry configured to:
determine whether corresponding rewritten captions for a segment of the requested second media asset can be read within a start and end time of the segment; and
in response to determining that the corresponding rewritten captions for the segment of the requested second media asset cannot be read within the start and end time of the segment:
further summarize the corresponding rewritten captions for the segment of the requested second media asset, wherein the further summarization is a shorter description of the captions file than the corresponding rewritten captions file that can be read within the start and end time of the segment.

14. The system of claim 10, further comprising, the control circuitry configured to:
access a GPS location of the user's mobile device;
determine based on the accessed location that the user is currently away from the media device; and
rewrite the captions file associated with the second media asset while the user is away from the media device.

15. The system of claim 10, further comprising, the control circuitry configured to:
determine that the user has placed a third and a fourth media asset in the playlist;
determine that the third media asset is currently being consumed by the user and the fourth media asset is not being currently consumed; and
in response to the determination that the fourth media asset is not being consumed, rewrite the captions file for only the fourth media asset.

16. The system of claim 10, wherein the factors external to the media asset include any one or more of the user's social media interactions, the user's text messages, and the user's geographical location.

17. The system of claim 10, wherein summarizing the captions file associated with the displayed first media asset further comprises, replacing or rewording a caption with a user defined term, synonym, antonym, abbreviation, symbol, emoji, emoticon, icon, or an image.

18. A method comprising:
determining display of a first media asset on a media device;
summarizing a captions file associated with the displayed first media asset based on a language proficiency level of a user consuming the first media asset, wherein the language proficiency level is determined based on factors external to the first media asset;
receiving user feedback based on the summarization of the captions file associated with the first media asset; and
prior to the user consuming a captions file associated with a second media asset placed in a playlist by the user, rewriting the captions file as a rewritten captions file, wherein the rewritten captions file associated with the second media asset incorporates the user feedback received for the summarization of the captions file for the first media asset.

19. The method of claim 18, further comprising:

accessing a GPS location of the user's mobile device;

determining based on the accessed location that the user is currently away from the media device; and rewriting the captions file associated with the second media asset while the user is away from the media device.

20. The method of claim 18, wherein summarizing the captions file associated with the displayed first media asset further comprises, replacing or rewording a caption with a user defined term, synonym, antonym, abbreviation, symbol, emoji, emoticon, icon, or an image.

* * * * *